US011890828B2

(12) United States Patent
Brinkmeyer et al.

(10) Patent No.: US 11,890,828 B2
(45) Date of Patent: Feb. 6, 2024

(54) MOISTURE EXTRACTION PRESS AND MOISTURE REMOVAL FROM WOOD MATERIALS

(71) Applicant: Idaho Forest Group, LLC, Coeur d'Alene, ID (US)

(72) Inventors: Marc Brinkmeyer, Coeur d'Alene, ID (US); Antonio Carvalho, Oporto (PT); Allen Selander, Coeur d'Alene, ID (US)

(73) Assignee: Idaho Forest Group, LLC

( * ) Notice: Subject to any disclaimer, the term of this patent is extended or adjusted under 35 U.S.C. 154(b) by 522 days.

(21) Appl. No.: 16/900,697

(22) Filed: Jun. 12, 2020

(65) Prior Publication Data

US 2021/0197512 A1 Jul. 1, 2021

Related U.S. Application Data

(60) Provisional application No. 62/955,103, filed on Dec. 30, 2019.

(51) Int. Cl.
*B30B 9/24* (2006.01)
*B30B 15/34* (2006.01)

(52) U.S. Cl.
CPC .............. *B30B 9/241* (2013.01); *B30B 9/246* (2013.01); *B30B 15/34* (2013.01)

(58) Field of Classification Search
CPC .. B30B 9/20; B30B 9/24; B30B 9/241; B30B 9/243; B30B 9/246; B30B 9/247; B30B 15/0082; B30B 15/34
See application file for complete search history.

(56) References Cited

U.S. PATENT DOCUMENTS 2,858,747 A 11/1958 Wagner
2,987,988 A 6/1961 Robledano
(Continued)

FOREIGN PATENT DOCUMENTS

CN 2887588 Y 4/2007
EP 2890553 A1 7/2015
(Continued)

OTHER PUBLICATIONS

PCT/US2020/067569—International Search Report and Written Opinion dated Jul. 8, 2021, 12 pages.
(Continued)

*Primary Examiner* — Jimmy T Nguyen
(74) *Attorney, Agent, or Firm* — Haynes Beffel & Wolfeld LLP; Andrew L. Dunlap

(57) ABSTRACT

The technology disclosed relates to moisture removal from wood materials. In particular, it relates to a press that includes a continuous and liquid permeable sheet metal band that makes use of viaways, grooves, perforations, or combinations thereof allowing liquid to permeate therethrough. The press can also include a first pressing roller located above the sheet metal band and a first anvil roller located below the sheet metal band and forming a first nip with the first pressing roller and the sheet metal band, such that the sheet metal band being located between the first pressing roller and the first anvil roller.

12 Claims, 15 Drawing Sheets
(8 of 15 Drawing Sheet(s) Filed in Color)

(56) References Cited

U.S. PATENT DOCUMENTS

| | | | | | |
|---|---|---|---|---|---|
| 3,800,952 | A * | 4/1974 | Bastgen | B01D 33/70 | |
| | | | | 210/324 | |
| 3,821,928 | A * | 7/1974 | Sugita | B30B 9/248 | |
| | | | | 100/118 | |
| 4,116,760 | A | 9/1978 | Kennedy | | |
| 2008/0296424 | A1 * | 12/2008 | Frangenberg | B02C 4/42 | |
| | | | | 241/231 | |
| 2016/0060339 | A1 | 4/2016 | Park | | |
| 2016/0297160 | A1 | 10/2016 | Bohnert et al. | | |

FOREIGN PATENT DOCUMENTS

| | | | | | |
|---|---|---|---|---|---|
| GB | 2004763 | A | * | 4/1979 | B30B 9/24 |
| GB | 2062483 | A | * | 5/1981 | B01D 33/04 |
| GB | 2078125 | A | | 1/1982 | |
| GB | 2090954 | A | | 7/1982 | |
| JP | 2014205179 | A | | 10/2014 | |
| WO | WO-9422666 | A1 | * | 10/1994 | A23N 1/00 |
| WO | WO-2014033156 | A1 | * | 3/2014 | B30B 13/00 |

OTHER PUBLICATIONS

PCT/US2020/067569—Demand and Article 34 Amendement dated Nov. 2, 2021, 19 pages.

PCT/US2020/067569—International Preliminary Report on Patentability dated Dec. 15, 2021, 23 pages.

Takahiro Yoshida, et al., Dewatering of high-moisture wood chips by roller compression method, Biomass and Bioenergy, vol. 34, Issue 7, 2010, pp. 1053-1058.

CA 3093353—Office Action Response dated Mar. 1, 2022, 25 pages.

CA 3093353—Office Action dated Nov. 17, 2021, 4 pages.

CA 3093353—Second Office Action dated Aug. 15, 2022, 4 pages.

EP 20848825—Communication pursuant to rules 161(1) and 162, dated Aug. 9, 2022, 3 pages.

CA 3093353—Response to Second Office Action filed Dec. 15, 2022, 4 pages.

* cited by examiner

PLAN VIEW

FRONT VIEW

INFEED SIDE VIEW

OUTFEED SIDE VIEW

601

MOISTURE CONTENT

602

MOISTURE CONTENT CHANGE

603

CURRENT DRAW

604

CURRENT DRAW

FLOW RATE

FLOW RATE

MOISTURE EXTRACTION PRESS AND MOISTURE REMOVAL FROM WOOD MATERIALS

PRIORITY

This application claims the benefit of U.S. Provisional Patent Application No. 62/955,103, entitled, "SAWDUST DEWATERING PRESS," filed on Dec. 30, 2019. The priority application is hereby incorporated by reference herein for all purposes.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Processing timber creates a variety of wood by-products, such as sawdust, wood chips and the like. During processing of wood in a timber mill or other facility, water may be introduced into the process in order to cool saw blades and other processing parts, as well as for cleaning. The water introduced, as well as the natural moisture content of the wood, is absorbed into by-products of the process, e.g., sawdust, wood chips, wood shavings and the like. In order to recycle these by-products of wood processing into clean burnable fuels, and the like and in order to reduce shipping costs, it is desirable to lower the moisture content of the wood materials formed as by-products of wood processing.

Conventional approaches to the problem of reducing moisture content are not cost effective (e.g., are of very low efficiency with respect to the amount of energy expended to only slightly reduce the moisture content), making their usage in scalable timber processing installations problematic. Often, conventional approaches do not reduce the moisture content sufficiently.

An opportunity arises to develop better machines and processes for removing moisture from wood materials. Better, more easily operated, more effective and efficient apparatus and systems may result.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of this summary is to present some concepts related to some exemplary non-limiting implementations in a simplified form as a prelude to the more detailed description of the various implementations that follow.

The technology disclosed relates to moisture removal from wood material including a press for extracting moisture. The press can include a continuous and liquid permeable sheet metal band that makes use of viaways, grooves, perforations, or combinations thereof allowing liquid to permeate therethrough. The press can also include a first pressing roller located above the sheet metal band and a first anvil roller located below the sheet metal band and forming a first nip with the first pressing roller and the sheet metal band, such that the sheet metal band being located between the first pressing roller and the first anvil roller. A conveyor roller is configured to convey the continuous sheet metal band between the first pressing roller and the first anvil roller at (i) a speed selectable within a range and (ii) at an angle with respect to a horizontal plane. The continuous sheet metal band conveys the wood material through the first nip. Pressure created by the first pressing roller and the first anvil roller extracts a portion of the moisture away from the wood material. At least some of the extracted portion of the moisture permeates through the viaways of the sheet metal band as a liquid, or slurry. The press configurations are operable without using a suction device, a blowing device or a scraping device.

Another moisture removing press configuration employs a second set of rollers disposed at the outfeed of the first pressing roller and the first anvil roller to further remove moisture from wood material output by the first pair of rollers. The second set of rollers includes a second pressing roller located above the loop formed by the sheet metal band and a second anvil roller located inside the loop formed by the sheet metal band. The sheet metal band passes through a second nip formed by the second pressing roller and the second anvil roller, and the second pressing roller and the second anvil roller are arranged downstream of the first nip.

Particular aspects of the technology disclosed are described in the claims, specification and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The color drawings also may be available in PAIR via the Supplemental Content tab.

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIGS. 6G and 611 provide charts that illustrate the throughput, measured in tons per hour at the infeed and the outfeed of the moisture removing press running at full speed and half speed with varying mat thicknesses of Hem Fir.

FIGS. 61 and 6J provide charts that illustrate the throughput, measured in tons per hour at the infeed and the outfeed of the moisture removing press running at full speed and half speed with varying mat thicknesses of Douglas Fir.

DETAILED DESCRIPTION

Figure 1:
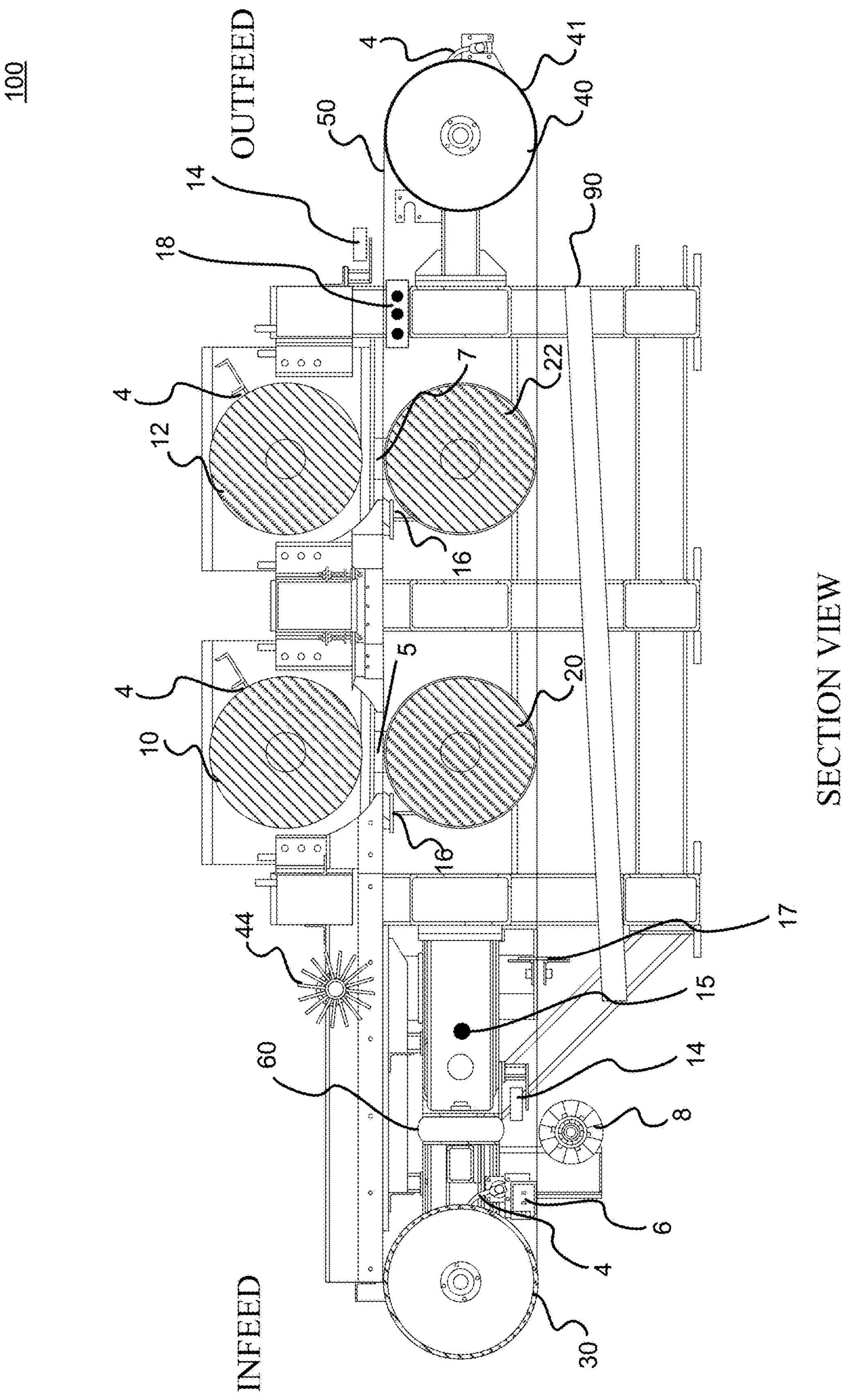
FIG. 1 illustrates a section view of a moisture removing press for extracting moisture from wood material.

The following description will typically be with reference to specific structural embodiments and methods. It is to be understood that there is no intention to be limited to the specifically disclosed embodiments and methods but that other features, elements, methods and embodiments may be used for implementations of this disclosure. Preferred embodiments are described to illustrate the technology disclosed, not to limit its scope, which is defined by the claims. Those of ordinary skill in the art will recognize a variety of equivalent variations on the description that follows. Unless otherwise stated, in this application specified relationships, such as parallel to, aligned with, or in the same plane as, mean that the specified relationships are within limitations of manufacturing processes and within manufacturing variations. When components are described as being coupled, connected, being in contact or contacting one another, they need not be physically directly touching one another unless specifically described as such. Like elements in various embodiments are commonly referred to with like reference numerals.

A more sophisticated moisture removing press and method is provided for improved efficiency in extracting moisture from wood materials, e.g., sawdust, wood chips, wood shavings, and other by-products of timber processing. In implementations, wood material is fed into an infeed side of the moisture removing press and onto to an endless permeable band (e.g., a metal band) that passes through one or more sets of rollers. Each set of rollers includes a pressing roller and an anvil roller disposed to form a nip, in which water can be pressed out of sawdust or other wood material. The metal band is arranged to pass through these nips and carry sawdust or other wood materials therethrough. Once moisture is removed, processed wood materials are output by the moisture removing press so that the processed wood materials can be used as boiler fuel and/or to be sold for pulp and/or paper products. Some implementations can efficiently bring wood material moisture content (MC) down to a percentage between 40-45%. Such a low MC increases the heat value of the wood material allowing for more efficient incineration. In some implementations, the moisture removing press is arranged at an angle with the horizontal plan that is substantially parallel to the floor upon which the moisture removing press sets, thereby enabling moisture removed from the wood materials by the moisture removing press to flow away to a collection bin or drainage system simply using gravity (as opposed to suction devices, etc.) and of course the use of the pressing and anvil rollers. In some implementations, grooves on anvil rollers provide water with a quicker escape route.

FIG. 1 illustrates a section view of a moisture removing press 100 for extracting moisture from wood material.

Wood material can be defined as any material comprising wood particles, such as sawdust, bark, pins, chips, etc. Further, moisture content of wood materials is defined as moisture composition by weight, meaning that the moisture content is the weight of the moisture relative to the total weight of the wood material including the moisture. Various method methods of determining moisture content are known to those who are skilled in the art.

Referring to FIG. 1, the moisture removing press 100 includes a continuous metal band 50, a first pressing roller 10 and a second pressing roller 12 located above the metal band 50, and a first anvil roller 20 and a second anvil roller 22 located below the metal band 50. The moisture removing press 100 is capable of removing moisture from wood material comprising water or other liquid by compressing the wood material between the first pressing roller 10 and the first anvil roller 20 and also by compressing the wood material between the second pressing roller 12 and the second anvil roller 22, such that the water or other liquid is expelled out of the wood material, portions of which permeate through the metal band 50 for collection, filtration and disposal.

Specifically, for example, the moisture removing press 100 is capable of brining moisture content of wood materials that is above 65% (or even more) to below 45%. This can be achieved for wood materials such as wood chips, wood shavings and other types and form factors of wood comprised of Douglas Fir, Hem Fir, Western Larch, and Spruce Pine, and other woods derived from various other breeds of trees are also able to be processed by some implementations.

Referring to FIG. 1, the moisture removing press 100 includes one or more pairings of the first and second pressing rollers 10, 12 and the first and second anvil rollers 20, 22 (e.g., a pairing of the first pressing roller 10 and the first anvil roller 20, and/or a pairing of the second pressing roller 12 and the second anvil roller 22). As illustrated, the first and second pressing rollers 10, 12 are disposed above the metal band 50 and the first and second anvil rollers 20, 22 are disposed below the metal band 50. The metal band 50 forms a loop, such that the first and second pressing rollers 10, 12 are located outside of the loop formed by the metal band 50 and the first and second anvil rollers 20, 22 are located inside of the loop formed by the metal band 50.

The metal band can be comprised of sheet metal or any other material that is continuous and that can withstand for forces created by the first and second pressing rollers 10, 12, the first and second anvil rollers 20, 22 and the wood material. The metal band 50 is preferably liquid permeable, where permeability can be provided by viaways (see viaways 51 of FIG. 2), perforations or similar mechanisms allowing liquid to permeate therethrough. Hereinafter, the term "viaway(s)" can be interpreted as a viaway(s) formed by perforations or other similar mechanisms to allow liquid to permeate through the metal band 50. At least a portion of the extracted portion of the moisture can permeate through the viaways of the metal band 50, as a liquid, without necessitating the use of a suction device, a blowing device, a scraping device, etc. Suction devices, blowing devices (e.g., an air blade) and/or scraping devices, etc., can be utilized to facilitate the removal of the extracted portion of the moisture, but such devices need not be implemented. Conventional systems require suction, blowing and scraping devices to assist with the removal of the extracted portion of the moisture. However, the moisture removing press 100 does not require such devices to achieve the desired results discussed throughout this document. This is due to the structure and orientation of the moisture removing press 100. Further, suction devices, blowing devices and/or scraping devices, etc. can be used to cleaning of the viaways of the metal band 50 and other portions of the moisture removing press 100, as discussed in more detail below.

A first pairing of the first pressing roller 10 and the first anvil roller 20 forms a first nip 5 therebetween with the metal band 50 as the metal band 50 conveys the wood material through the first nip 5. This first nip 5 is located at an infeed side of the moisture removing press 100. As illustrated, the metal band 50 is located between the first pressing roller 10 and the first anvil roller 20. The metal band 50 conveys the wood material through the first nip 5. Pressure created by the first pressing roller 10 and the first anvil roller 20 extracts a portion of the moisture away from the wood material.

A second pairing including the second pressing roller 12 and the second anvil roller 22 form a second nip 7 therebetween with the metal band 50 as the metal band 50 conveys the wood material through the second nip 7. As illustrated, the metal band 50 is located between the second pressing roller 12 and the second anvil roller 22. The metal band 50 continues to convey the wood material through the second nip 7 after the wood material has passed through the first nip 5. As the wood material passes through the first nip 5 and the second nip 7, moisture from the wood material is extracted or expelled from the wood material, such that portions of the extracted/expelled moisture permeates the metal band 50 in the form of liquid that can be diverted and contained for further processing.

First and second pressing rollers 10, 12 and first and second anvil rollers 20, 22 can be made of solid steel or other materials exhibiting similar weight and strength properties and can be driven by motors (not shown in FIG. 1 for clarity sake) individually or in pairs via gearing, chain drives, or the like.

The moisture removing press 100 further includes a conveyor roller 30 at the infeed side of the moisture removing press 100 and includes a conveyor roller 40 at the outfeed side of the moisture removing press 100. Two conveyor rollers are not necessary and a single conveyor roller implementation can be utilized. The conveyor rollers 30, 40 are configured to convey the metal band 50 between the first and second pressing rollers 10, 12 and the first and second anvil rollers 20, 22 (i.e., through the first nip 5 and the second nip 7) at (i) a variable speed that is selectable within a range and (ii) at a variable and particular angle with respect to a horizontal plane relative to the moisture removing press 100. In one configuration, the second anvil roller 20 can drive the conveyor roller 40 using a sprocket and chain located at the outfeed side of the moisture removing press 100, such that the driven conveyor roller 40 drives the metal band 50. In addition to the sprocket and chain configuration, which is discussed below in more detail, the first anvil roller 20 can drive a drive a chain located at the infeed side of the moisture removing press 100 and connected to the conveyor roller 30, which in turn also drives the metal band 50. Other drive configurations, gearing, different arrangements of motor, etc. are contemplated and will be evident to those skilled in the art.

Regarding the variable speed of the metal band 50 being selectable in a range, the moisture removing press 100 is capable of operating in a manner, such that the selectable speed range is essentially between a speed of 65 feet per minute (fpm) and just below 118 (fpm). In other implementations higher or lower speeds can be used. Introduction of the wood material into the infeed side of the moisture removing press 100 can be controlled so as to keep up with the speed of the metal band 50, while not overloading the metal band 50 with the wood material. Further, rotational speeds of the first and second pressing rollers 10, 12 and rotational speeds of the first and second anvil rollers 20, 22 can be varied with respect to one another and with respect to the variable speed of the metal band 50 or the rotational speeds of these components can essentially be the same. As discussed below in more detail, the rotational speed of each of the first and second pressing rollers 10, 12 and each of the first and second anvil rollers 20, 22 is independently controlled by a motor.

Regarding the metal band 50, in various implementations the viaways of the metal band 50 can have diameters (on average) ranging from essentially 2.0 mm to 5.5 mm. The metal band 50 can have the viaways with the same diameter size throughout the metal band 50 or the metal band can have varying sized diameters. The open area provided by the viaways of the metal band 50 can range from 29% open area to 31% open area (meaning that essentially 29% to 31% of the metal band 50 has viaways that are open forming the open area). In other implementations the open area can reach 50% of the metal band 50. Other configurations are also possible. The viaways can also be configured to have varying triangular pitches. In various implementations, the triangular pitch can vary between 3.0 mm and 10 mm, depending on the desired hole diameter of the viaways. In various implementations a thickness of the metal band 50 can essentially range from 0.3 mm to 2.5 mm. In an implementation, the metal band 50 can be comprised of stainless steel with an austenitic microstructure.

Figure 7:
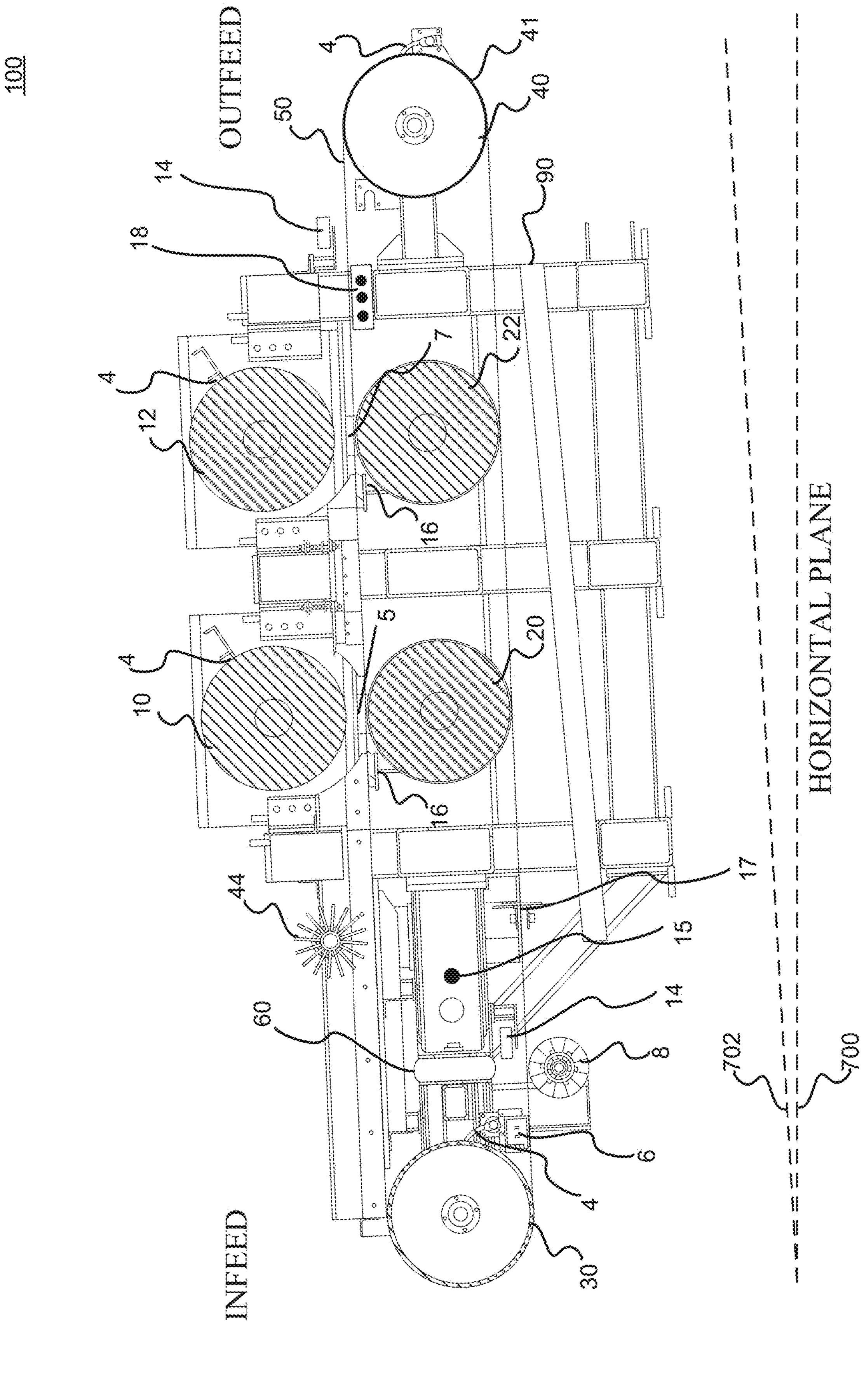
FIG. 7 illustrates the section view of FIG. 1, except that the angle between the infeed side and the outfeed side with respect to a horizontal plane is further illustrated.
Figure 8:
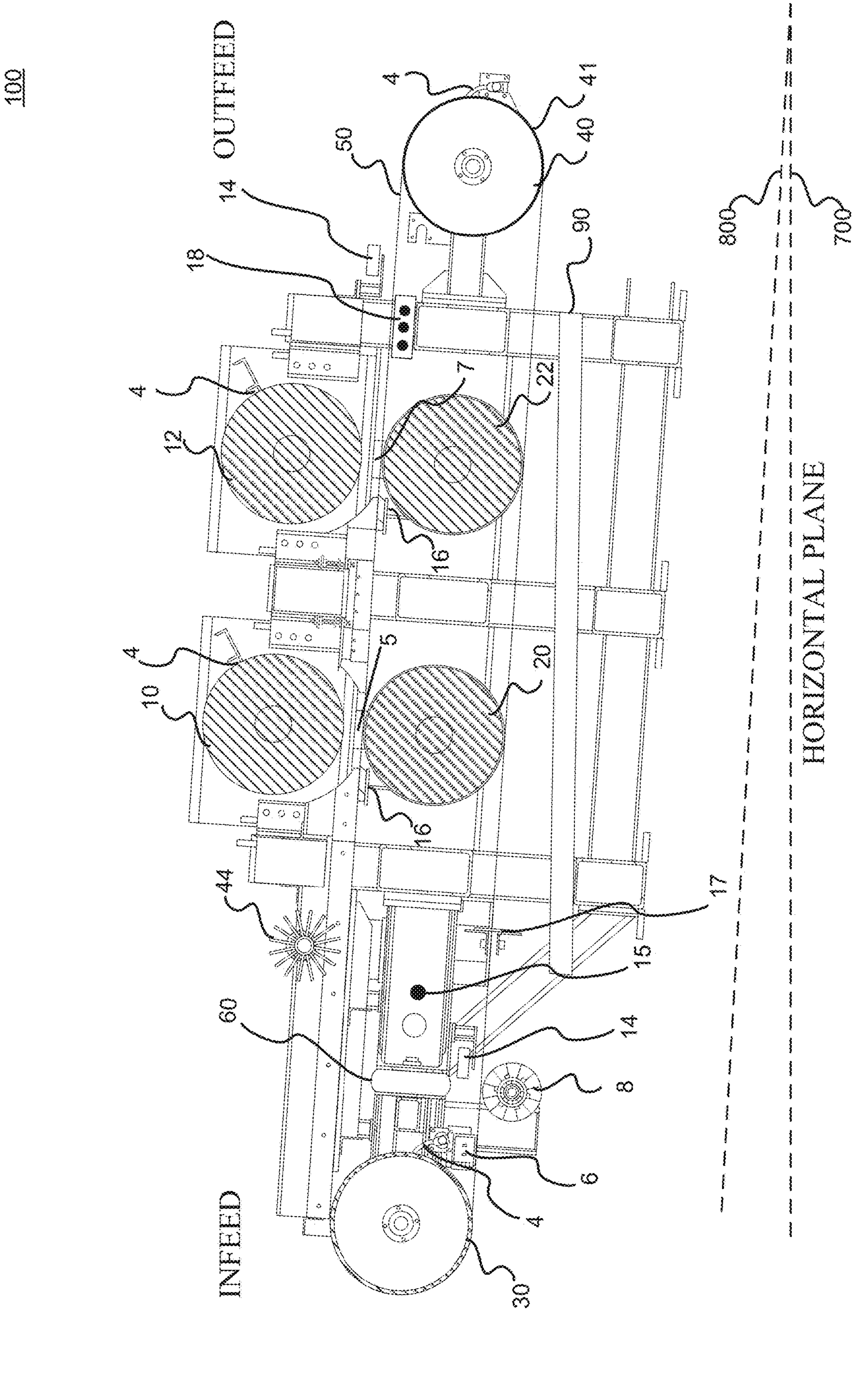
FIG. 8 illustrates the section view of FIG. 1, except that the angle between the infeed side and the outfeed side with respect to a horizontal plane is further illustrated.

As mentioned above, in an implementation, the moisture removing press 100 can be adjusted so that an angle between the infeed side of the moisture removing press 100 (i.e., the side of the moisture removing press including the conveyor roller 30) and the outfeed side of the moisture removing press 100 (i.e., the side of the moisture removing press including the conveyor roller 40) can be set between essentially 1 degree and essentially 10 degrees with respect to a horizontal plane 700 (see FIG. 7, which illustrates an angle 702 of inclination between the infeed side and the outfeed side with respect to the horizontal plane 700; and FIG. 8, which illustrates an angle 800 of declination between the infeed side and the outfeed side with respect to the horizontal plane 700). The horizontal plane 700 is essentially level to a surface upon which the moisture removing press 100 resides. In one configuration of the moisture removing press 100, the angle is inclined from the infeed side of the moisture removing press 100 to the outfeed side of the moisture removing press 100, such that the outfeed side of the moisture removing press 100 is elevated higher than the outfeed side of the moisture removing press (see FIG. 7).

In an alternative configuration, the angle is declined from the infeed side of the moisture removing press 100 to the outfeed side of the moisture removing press 100, such that the infeed side of the moisture removing press 100 is elevated higher than the outfeed side of the moisture removing press 100 (see FIG. 8).

A water tray 90 facilitates liquid drainage of water and other liquids removed from the wood materials by the moisture removing press 100. The water tray 90 can be disposed at an angle to allow for drainage on one end of the water tray 90 or another end of the water tray 90. The water tray 90 can also be conical so as to allow for drainage through a central location on the water tray 90.

In one implementation the selectable pressure range includes a range between 5,000 pounds per square inch (psi) and 8,000 psi. The pressure range can be adjusted by adjusting heights of the first and second pressing rollers 10, 12 with respect to the metal band 50 and the first and second anvil rollers 20, 22, adjusting a thickness of the metal band 50 and adjusting a thickness of the wood material as it is conveyed through the nips 5 and 7. The wood material as it lays on the metal band 50 can be referred to as a "mat," such that pressure applied to the wood material can be adjusted by changing the thickness of the mat. One implementation of the moisture removing press 100 creates a pressure of about 6,000 psi at the nips 5 and 7, while running with a linear speed of approximately 75 fpm or higher. This high pressure of 6,000 allows the moisture removing press 100 to run at a much higher rate than conventional machines or even at a lower rate than conventional machines with improved electrical efficiency and improve moisture content removal. The thickness of the mat of wood material can be adjusted and manipulated as the wood material enters the moisture removing press 100. As explained below in various examples, the thickness of the mat can be adjusted between various ranges, such as a range of essentially 2 inches to 4 inches. Thicker or narrower mats can also be implemented.

In some implementations the moisture removing press 100 includes bed plates 16 at infeed portions before the nips 5 and 7 to provide support for the metal band 50 and to help prevent the metal band 50 from flexing while pressure is applied at the nips 5 and 7.

The moisture removing press 100 can also include various scrapers 4 to remove wood material debris, liquid and other items from the first and second pressing rollers 10, 12, the first and second anvil rollers 20, 22 and the conveyor rollers 30, 40. The structure of the various scrapers 4 is clear from the illustration of FIG. 1. However, alternative structures will be apparent to a person of ordinary skill in the art. The scrapers 4 can be ultra-high-molecular weight (UHMW) polyethylene scrapers and the scrapers can be located inside or outside the loop of the metal band 50. Furthermore, the moisture removing press 100 can include a scraper 6 located at a return side of the infeed so clear off the metal band 50 before it comes back into contact with the conveyor roller 30. The scraper 6 can be a v-shaped plough scraper. Additional scrapers 17 can be implemented to scrape the top and/or bottom of the metal band 50 prior to contact with the conveyor roller 30.

Figure 2:
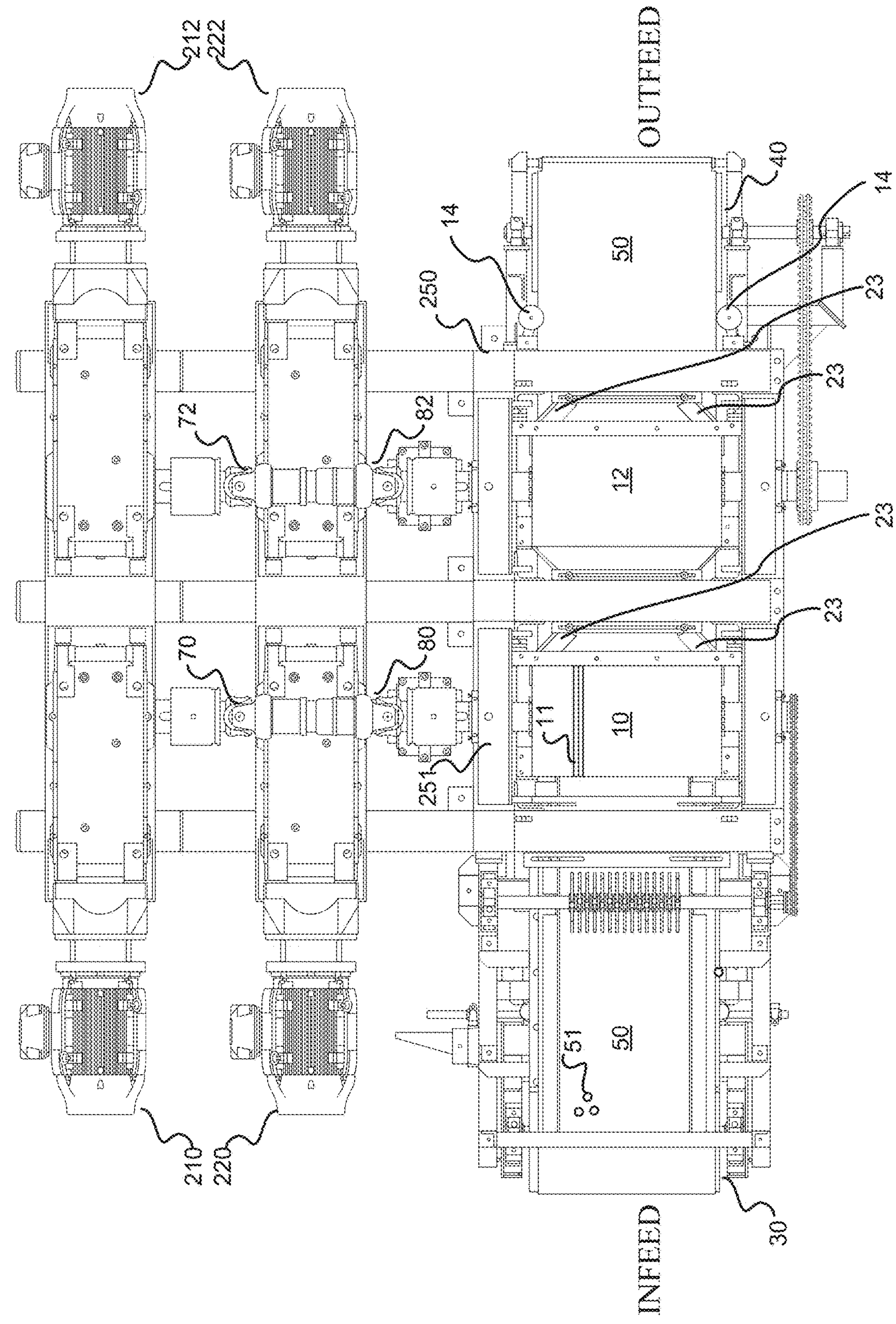
FIG. 2 illustrates a plan view of a moisture removing press for extracting moisture from wood material.

Further, the moisture removing press 100 can includes one or more mat funnels 23 (see FIG. 2). Specifically, a mat funnel 23 can be located between the first and second pressing rollers 10, 12 and above the mat of wood material to funnel and evenly distribute the wood material prior to entering nip 7. This helps to provide an even wood material and moisture distribution before the wood material enters the nip 7. Another mat funnel 23 can be located after the second pressing roller 12 to funnel and evenly distribute the wood material before exiting the outfeed end of the moisture removing press 100. The one or more mat funnels 23 and other components of the moisture removing press 100 can also be adjusted and arranged to provide a desired mat thickness and a desired amount of funneling.

Additionally, the moisture removing press 100 can include one or more airbags 60 to create and maintain tension in the metal band 50 by pressing the conveyor roller 30 away from other components of the moisture removing press 100, such as the conveyor roller 40. Multiple airbags 60 can be used to prevent slippage of the metal band 50 and to improve tracking of the metal band 50 by preventing the metal band 50 from steering to one side or the other while it is moving. The use of multiple airbags 60 further improves tension, as opposed to a single airbag 60, as more or less movement and tensioning can be applied to opposing sides or axles of the conveyor roller 30 via arms connected to the conveyor roller 30. The pressure applied by the airbags 60 can be individually adjusted based on feedback provided regarding the tensioning and the position of the metal band 50. A single airbag 60 can also be used to maintain tension.

Referring to FIG. 1, The metal band 50 can be tensioned by inflating in one configuration a single convoluted airbag 60 (such as for example, a type 113-1, assembly no. W01-358-7092 by Firestone or similar) centered with the metal band 50, configured to act as an air spring. This airbag 60 can be maintained at an air pressure of between and including essentially 5-120 psi. For example, a pressure of 20 psi, which causes a height of approximately 3½" (half of manufacturer's recommended height) can be maintained. This configuration makes it possible for the airbag 60 to withstanding a force of about 2500 lbs. In implementations, the height of the airbag 60 can be increased to provide the metal band 50 with a tight tensioning. Some implementations include using a lower pressure and height as a precautionary measure provided that the metal band 50 continues to track.

As discussed above, multiple airbags 60 can be used, as opposed to having a single airbag 60 centered with the metal band 50. In an implementation the airbags 60 can be aligned with or near the edges of the metal band 50. This configuration distributes the tensioning stress on the airbags 60 and provides more control for tracking of the metal band 50. In this alternative configuration, two airbags 60 can be smaller single convoluted (such as for example, a type 131, assembly no. W01-358-7731 by Firestone or similar) airbags 60, positioned at each side of the metal band 50, maintained at a pressure of between and including essentially 5-120 psi. For example, a pressure of 100 psi and a height of approximately 3½" (manufacturer's recommended height) can be maintained making it possible for the two airbags 60 to withstanding a total force of about 3000 lbs.

A high-pressure spray bar 15 for cleaning both dirty surfaces and clogged viaways in the metal band 50 can also be implemented. The spray bar 15 can help to remove debris that is not removed by the scrapers 4 (e.g., debris that cannot be reached by the scrapers 4 that is stuck in the viaways). The location of the high-pressure spray bar 15 is merely an example, as the spray bar 15 can be placed anywhere in the vicinity of the metal band 50, such that liquids sprayed from spray bar 15 come into contact with the metal band 50. The location of the spray bar 15, as illustrated, allows for cleaning of extra debris that could fall from the conveyor roller 30. The spray bar 15 can be implemented to create a "curtain" of liquid that clears out clogged viaways using a pressure range of, for example, 1,500 psi to 3,000 psi, or even more. The liquids sprayed out of the spray bar 15 can range from water to other various chemicals that would assist in the removal of wood particles from the metal band 50, as well as other chemicals that would improve the performance of the moisture removing press 100.

Moreover, rubber lagging 41 can be implemented on one of the conveyor rollers 30, 40 to prevent slippage of the metal band 50 and improve tracking. FIG. 1 illustrates the rubber lagging 41 as being located on the conveyor roller 40. The rubber lagging 41 cannot be implemented on both conveyor rollers 30, 40 at the same time, as the two rubber laggings 41 would be fighting against each other. The rubber lagging 41 is a rubberized material surrounding at least a portion of the circumference of one or both of the conveyor rollers 30, 40. A leveling roll 44 can be implemented to level, control and maintain a constant mat thickness, and a rotating cleaning device 8 (e.g., a brush) can be implemented to clean debris from the metal band 50. The rotating cleaning device 8 can be outside the loop of the metal band 50 (as illustrated) or the rotating cleaning device can be disposed inside the loop of the metal band 50. Further, one or more torque arms 14 can be implemented to force correct positioning (tracking) of the metal band 50. The speed of the leveling roll 44 can be adjusted based on the moisture content, density and volume of the wood material being feed into the moisture removing press, so as to be able to receive the wood material at a faster rate, more efficiently and to help provide a more even mat of wood material as it enters the first nip 5.

Additionally, the first and second anvil rollers 20, 22 can have grooved surfaces (see grooves 11 of FIG. 2) to provide an escape route for liquid extracted/removed from the wood material. Also, in an implementation as discussed above, the v-shaped plough scraper 6 can be provided at a location where the metal band 50 returns to a bottom side of the conveyor roller 30 in order to improve the cleaning of debris from the metal band 50. A heating element 18 can be disposed outside or inside the loop formed by the metal band 50.

In FIG. 1, the heating element 18 is disposed inside the loop formed by the metal band 50. This is merely an example location and dimension of the heating element 18. There can be multiple heating element, such as, for example, another heating element 18 disposed directly above the heating element 18 to as to heat the wood material and the metal band 50 from above. In an implementation, the heating element 18 can be disposed inside the loop between the first and second anvil rollers 20, 22, so as to provide heat to the wood material as it passes over the heating element between the first nip 5 and the second nip 7. The heating element can be a variably controlled heating element with the source of the heat coming from, for example, electrical resistances or other ways that would be understood by a person of ordinary skill in the art. The purpose of the heating element 18 is to improve the amount of moisture removed from the wood particles, without burning or damaging wood particles. The amount of heat generated by the heating element 18 can be dependent upon the speed at which the moisture removing press 100 is operating, the thickness of the mat formed by the wood particles, the type or composition of wood particles, the initial moisture content of the wood particles, as well as the thickness of the nips 5 and 7. The heating element can be attached to a heat conductive material to dissipate heat to various locations of the moisture removing press 100. Multiple heating elements can be installed at various locations, so as to keep the metal band 50 at a temperature that causes moisture to be released from the wood material.

As mentioned above, the first and second pressing rollers 10, 12 can be comprised of solid steel and facilitate the moisture removing process. In a particular configuration the first and second pressing rollers 10, 12 each apply a pressure of about 6000 psi at a rate of approximately 75 fpm (i.e., speed of metal band 50 is essentially 75 fpm in this implementation). However, the pressure and speed variables are influenced by the size of the nips 5, 7 and by the thickness of the mat of wood material. In an implementation, a gap size (e.g., nip height) of essentially 0.5 inches and essentially 0.375 in, was set for the first nip 5 and second nip 7, respectively. Higher and/or lower nip heights are readily achievable in some implementations, as described below in more detail.

FIG. 2 illustrates a plan view of a moisture removing press 100 for extracting moisture from wood material Many of the reference elements illustrated in FIG. 2 are described above with reference to FIG. 1. Redundant descriptions of the reference elements of FIG. 2 that are described above with reference to FIG. 1 are omitted. The plan view provided by FIG. 2, illustrates the metal band 50 as it extends from the infeed side of the moisture removing press 100 to the outfeed side of the moisture removing press 100. Further, as illustrated, the first and second pressing rollers 10, 12 are located above the metal band 50.

Additionally, as illustrated, the moisture removing press 100 can be configured with four electrically powered motors 210, 212, 220, 222 that are configured to drive the first and second pressing rollers 10, 12 and the first and second anvil rollers 20, 22, respectively. Motor 210 is coupled by universal joints 70, 80 to the first pressing roller 10 and motor 212 is coupled by universal joints 72, 82 to the second pressing roller 12. The universal-joints 70, 80 and 72, 82 couple the first and second pressing rollers 10, 12 to a source of rotary motion to rotate the first and second pressing rollers 10, 12. Motors 220, 222 are respectively coupled to the first and second anvil rollers 20, 22. In an implementation, the motors 210, 212, 220, 222 are 100 horsepower electric motors. Other motors of varying horsepower and of varying type can be used. The universal joints 70, 72, 80, 82 allow for adjustment of the height of the first and second pressing rollers 10, 12 with respect to the first and second anvil rollers 20, 22, thus allowing the nip height at each nip 5, 7 to be adjusted, without also adjusting the heights of the motors 210, 212.

Referring to FIG. 2 a frame 250 is coupled by linkages 251 configured to set and maintain a desired nip height (i.e., height of gap between pressing roller and anvil roller at each nip 5, 7). The nip height at each nip 5, 7 can be essentially the same or it can be configured to vary between the nips 5, 7. Additionally, nip heights can be manually adjusted or adjusted using other mechanisms, such as hydraulics for adjusting the height of the first and second pressing rollers 10, 12 with respect to the location of the first and second anvil rollers 20, 22 and the metal band 50. A feedback system can be implemented using load sending units and automatically adjustable hydraulics or other mechanisms in order to automatically adjust to different mat thicknesses and different compositions, types and breeds of the wood material. The entire frame 250 can be adjusted to assist in the exertion and maintaining of desired nip heights or the frame 250 can remain stationary while other components such as linkages, hydraulics, etc. use the frame 250 as a source of stability for adjusting the nip heights. The nip height allows for the exertion and maintaining of pressure via the first and second pressing roller 10, 12 on the wood material as it proceeds through the nips 5, 7 (as illustrated in FIG. 1).

Other drive configurations, gearing, different arrangements of motor, etc. are contemplated and will be evident to those skilled in the art.

Figure 3:
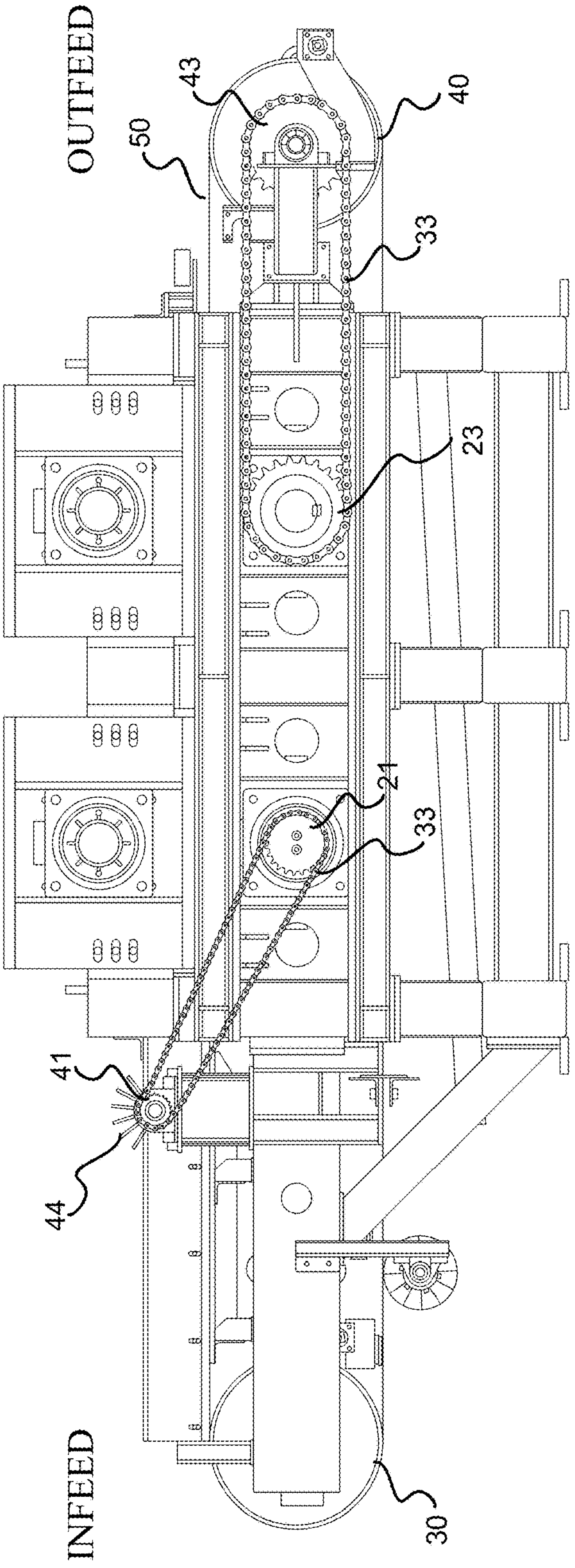
FIG. 3 illustrates a front view of a moisture removing press for extracting moisture from wood material.

FIG. 3 illustrates a front view of a moisture removing press 100 for extracting moisture from wood material.

As illustrated in FIG. 3, the second anvil roller 22 (see FIG. 1) drives a sprocket 43 of the conveyor roller 40 using a chain 33 connected to both the sprocket 43 and a sprocket 23 coupled to a drive shaft of the second anvil roller 22. The sprocket 23 of the second anvil roller 22 transfers motive force via the chain 33 to the sprocket 43 conveyor roller 40.

In turn, the conveyor roller 40 drives the metal band 50. In one implementation, double strand sprockets 23, 43 and chain sizes of about #80 to about #120 are employed for driving the conveyor roller 40, which in turn drives the metal band 50. However, other drive configurations, gearing, different arrangements of motor, etc. are contemplated and will be evident to those skilled in the art.

Further, an implementation of the moisture removing press 100 includes a sprocket 21 driven by the first anvil roller 20. Sprocket 21 transfers motive force via chain 33 to a like sprocket 41 coupled to the leveling roll 44, as discussed above with reference to FIG. 1.

Figure 4:
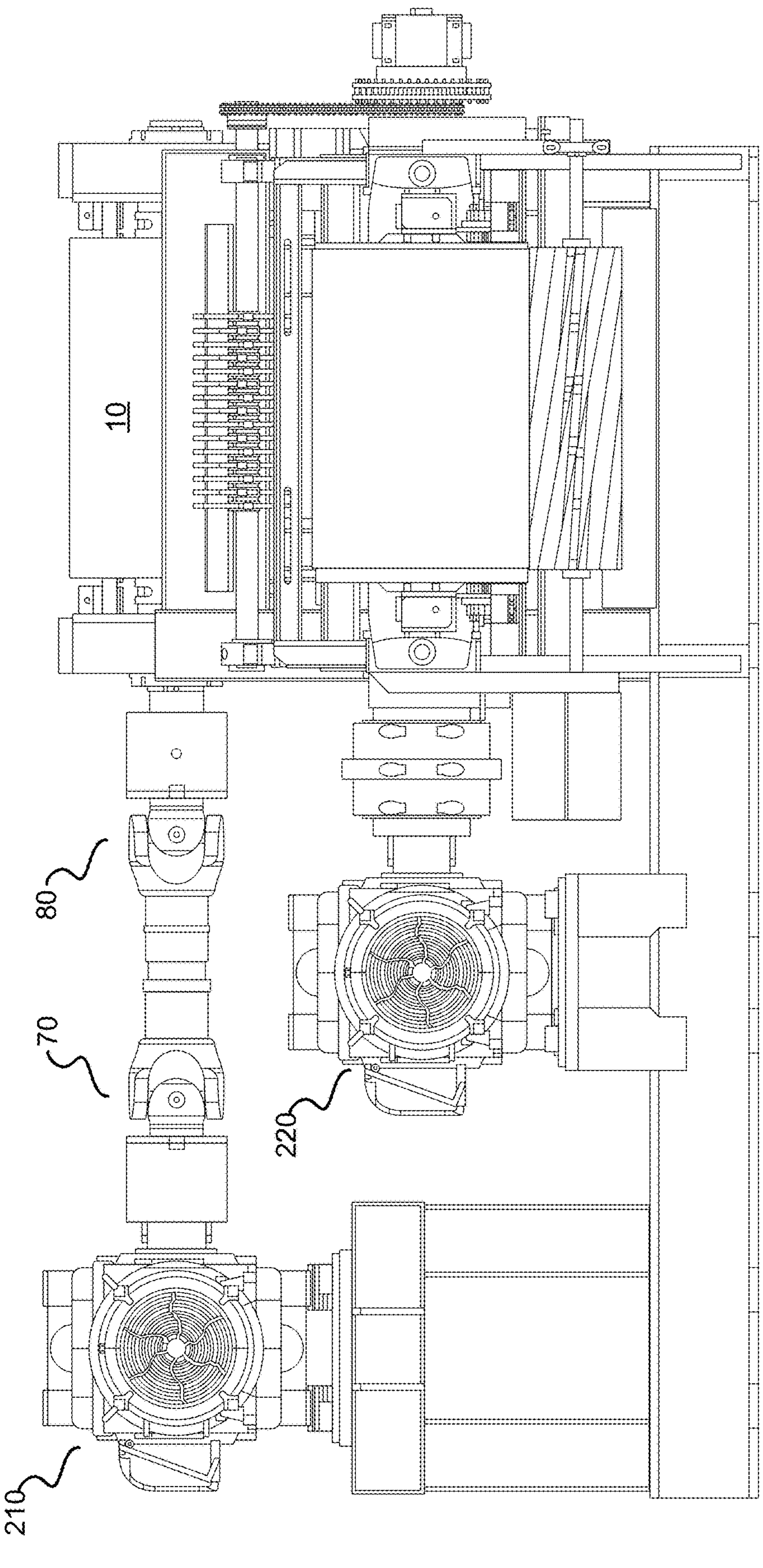
FIG. 4 illustrates an infeed side view of a moisture removing press for extracting moisture from wood material.
Figure 5:
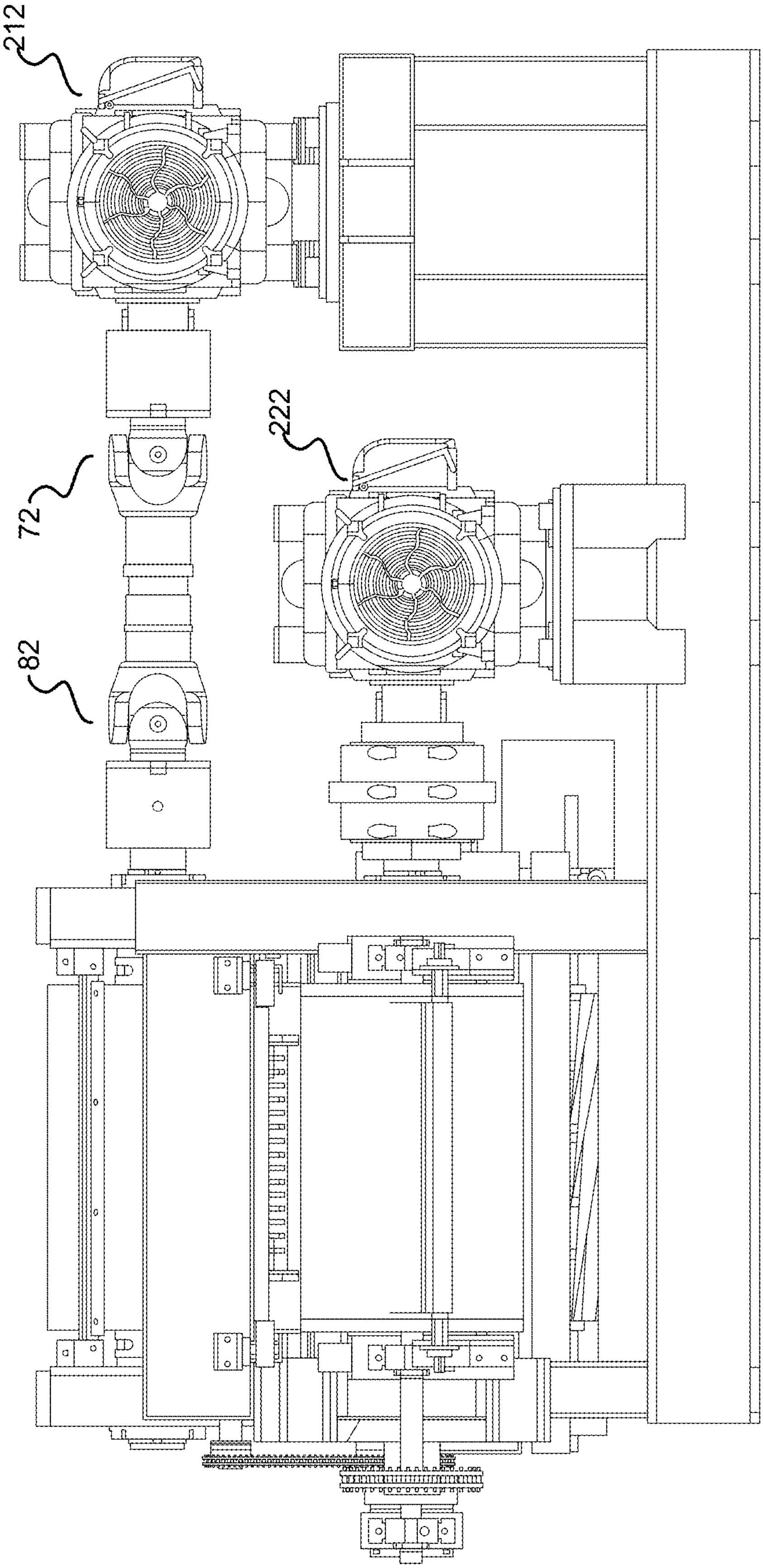
FIG. 5 illustrates an outfeed side view of a moisture removing press for extracting moisture from wood material.

FIG. 4 and FIG. 5 respectively illustrate an infeed side view and an outfeed side view of a moisture removing press 100 for extracting moisture from wood material. FIGS. 4 and 5 illustrate the same elements illustrated in FIGS. 1-3, as discussed in detail above. Redundant descriptions of these elements are omitted.

Additional features included in various implementations of the moisture removing press 100 include limit switches to shut down the moisture removing press 100 (or cause some further corrective measure) should the metal band 50 lose tracking and veer too far to one side or the other with respect to the conveyor rollers 30, 40, the first and second pressing rollers 10,12 and the first and second anvil rollers 20, 22.

Efficacy

Testing of an example moisture removing press 100 was conducted with several sawdust samples collected, using different mat sizes (i.e., different thicknesses of the wood material on the metal band), roller gaps and metal band speed configurations, in order to measure the change % in moisture content and how it is affected. Wood material samples were drawn from different species of wood, including Hem Fir (HF) with a moisture content of 61% at the infeed and Doug Fir (DF) with a moisture content of 54% at the infeed. At the start of the testing period a tachometer was used to determine the relationship between the speed of the belt and its frequency in the variable frequency drive (VFD). Every 10 Hz frequency increment equaled a 24-fpm increment of linear speed. The maximum speed was set at 48.75 Hz, which equals 117 fpm. Half speed was also tested at 24.375 Hz, which equals 58.5 fpm. The following results were obtained while running sawdust test samples without the 5⁄16" screen on the chip screen.

During testing, the first and second pressing rollers 10, 12 were adjusted to form a nip height/gap (i.e., gaps in the nips 5, 7) in the range of essentially 0.375 to 0.5 inches. Once the first and second pressing rollers 10, 12 were adjusted, a mat thickness of 2, 3 and 4 inches was pressed through the rollers and the moisture content, amperage draw, and sawdust water flow rates were measured. As mentioned above, all these readings were taken for the example moisture removing press 100 running at full speed (117 fpm) and also running at half-speed (58.5 fpm) with varying mat thicknesses.

Figure 6A:
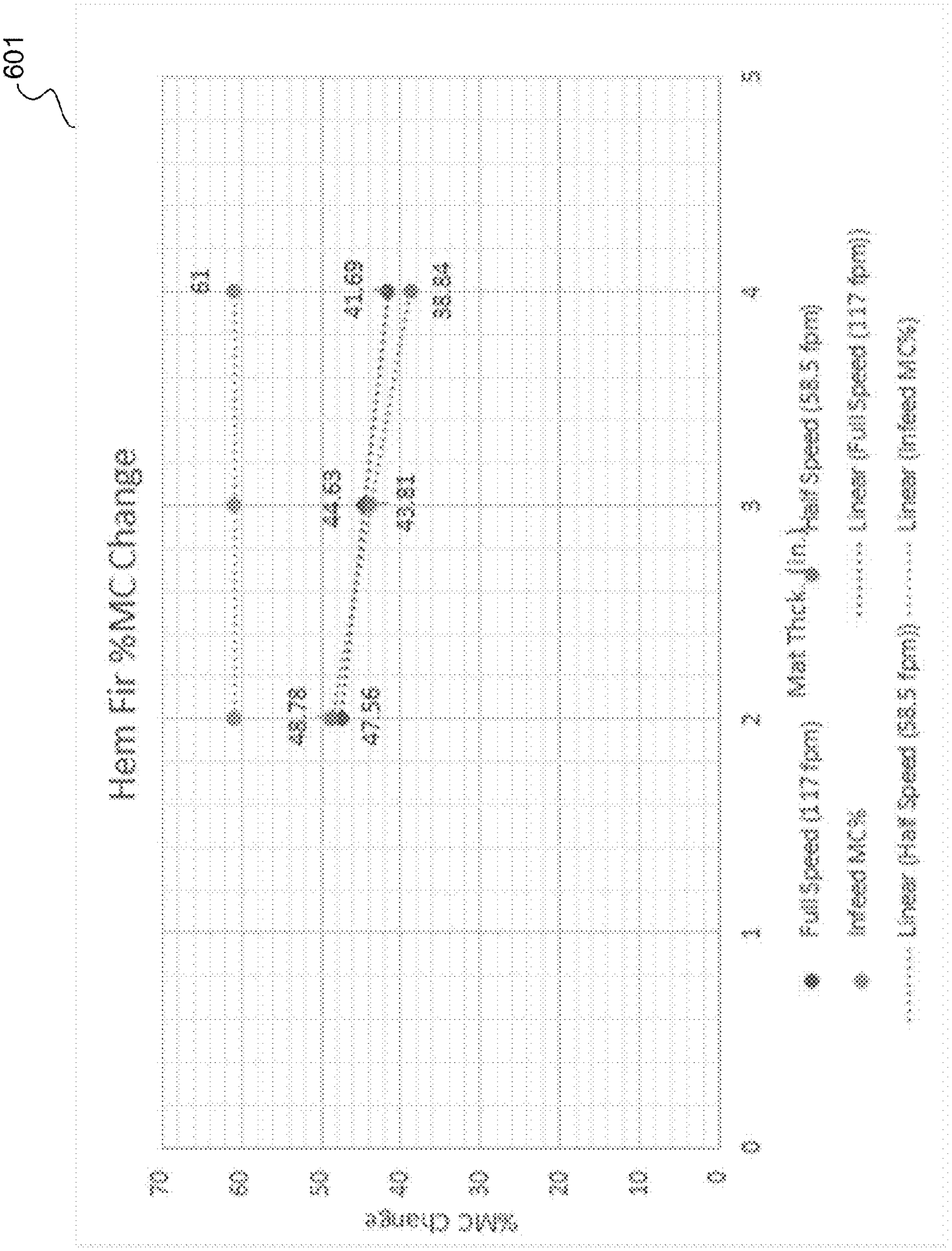
FIGS. 6A and 6B provide charts representing test results (i.e., moisture content change and mat thickness) of the moisture removing press performing a moisture removal process on Hem Fir and Douglas Fir, respectively.
Figure 6B:
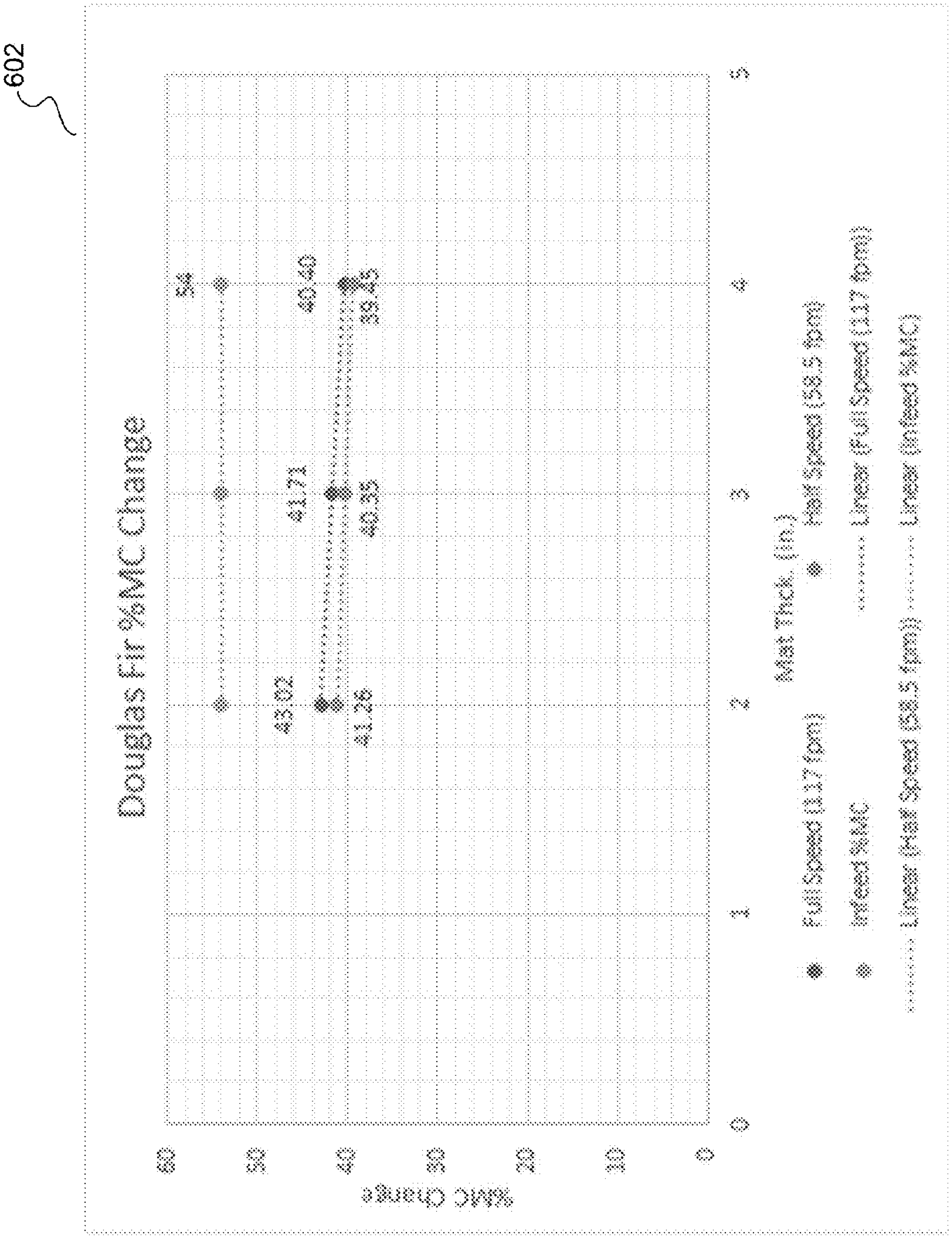

FIGS. 6A and 6B are charts representing test results performed with Hem Fir and Douglas Fir, respectively.

As observed in the chart 601 of FIG. 6A, the % MC (percentage of moisture content) at the infeed was 61% for Hem Fir. After being compressed with a 4-inch mat, the measured MC was 41.69% and 38.84% for full and half speed, respectively. With a 3-inch mat, the measured MC was 44.63% and 43.81% for full and half speed, respectively. With a 2-inch mat, the measured MC was 47.56% and 48.78% for full and half speed, respectively. At half speed, slightly better results were found as the mat thickness increased.

In chart 602 of FIG. 6B, for Douglas Fir, the infeed was at 54%. After being compressed with a 4-inch mat, the measured MC was 40.40% and 39.45% for full and half speed, respectively. With a 3-inch mat, the measured MC was 41.71% and 40.35% for full and half speed, respectively. With a 2-inch mat, the measured MC was 43.02% and 41.26% for full and half speed, respectively. At half speed slightly better results in moisture content removal were obtained due to the time allowed for water to escape the press area.

Figure 6C:
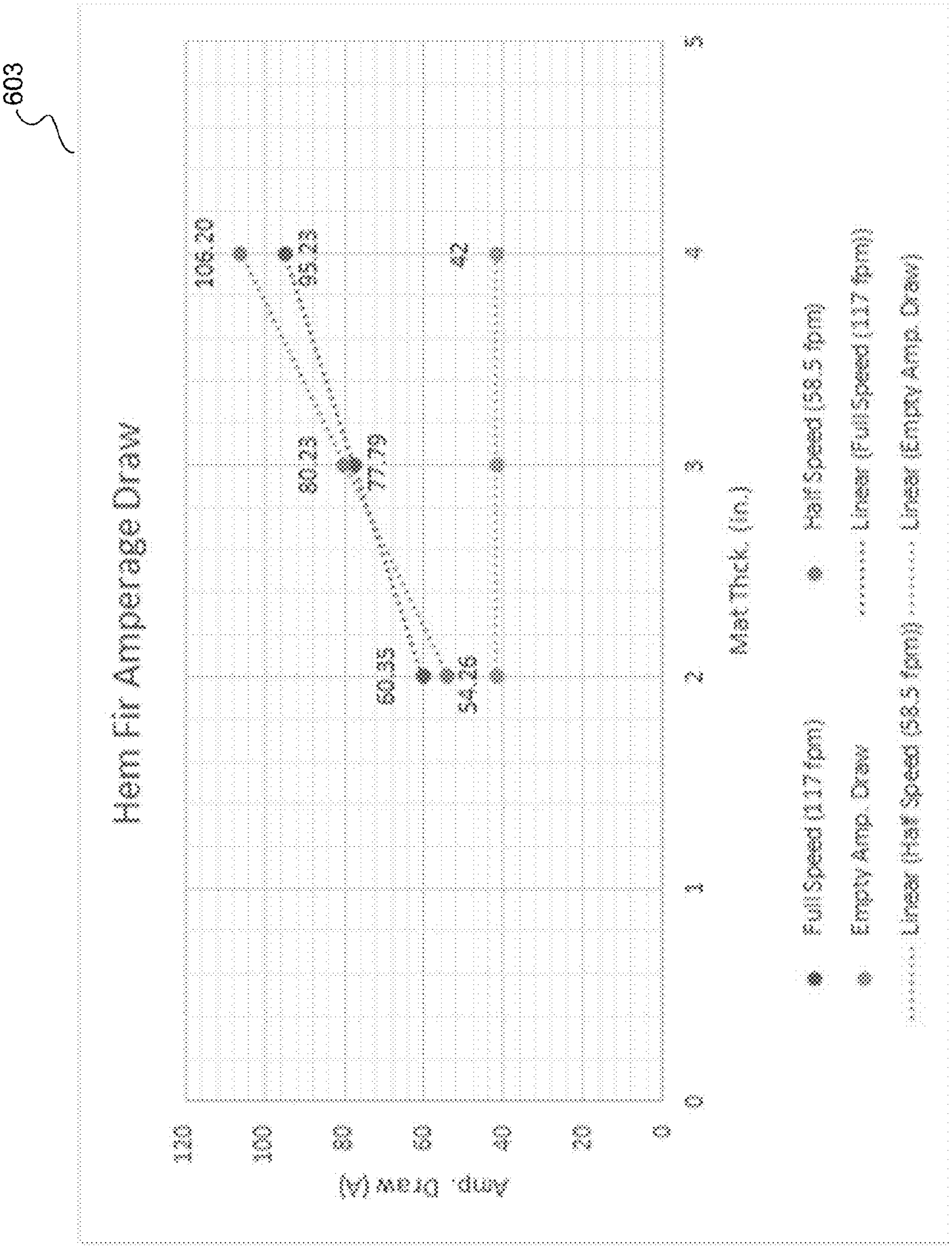
FIGS. 6C and 6D provide charts representing observed current draw values while the moisture removing press removes moisture with a four-roller configuration for each test illustrated in and discussed with reference to FIGS. 6A and 6B.
Figure 6D:
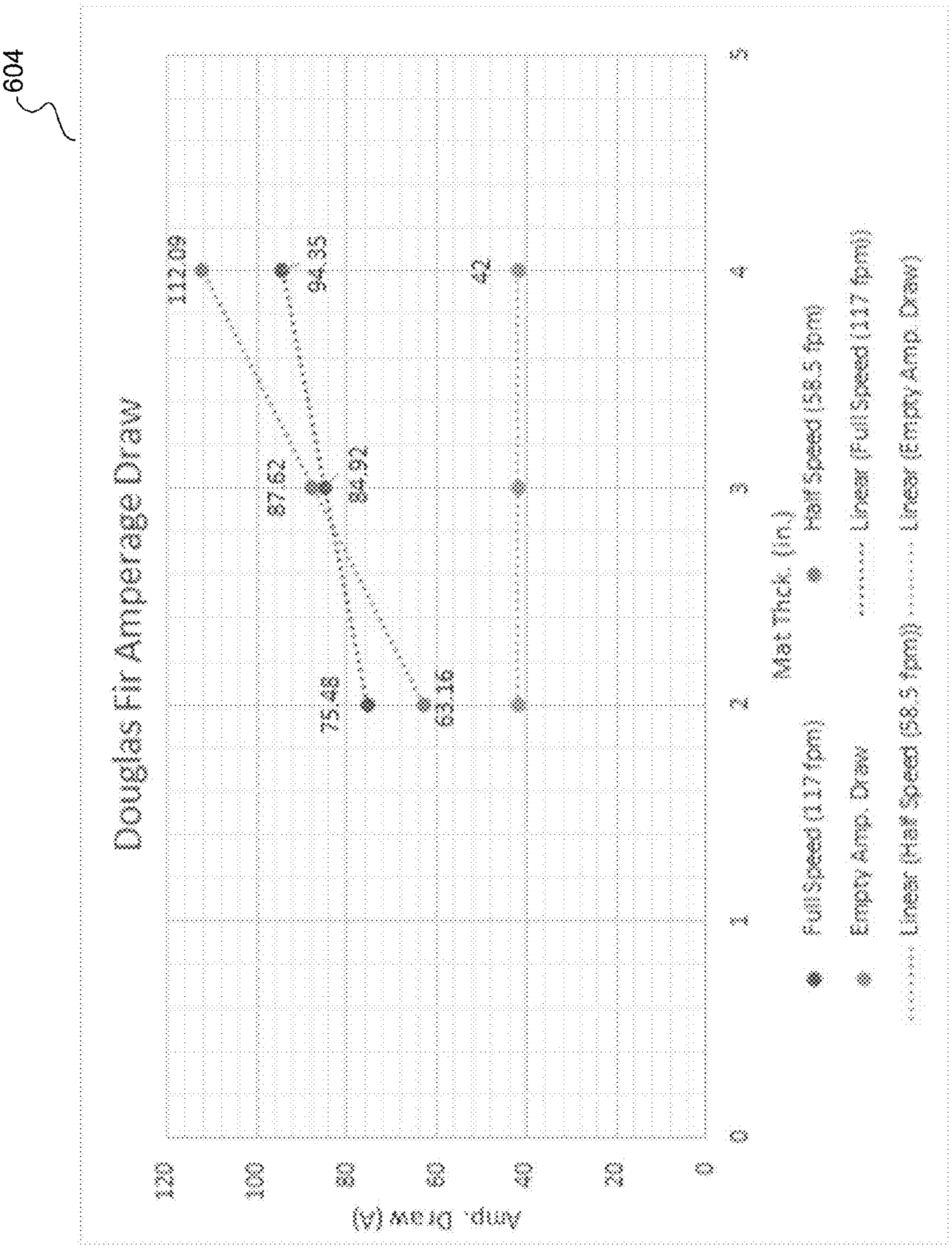

As sawdust was pressed through the first and second pressing rollers 10, 12 and the first and second anvil rollers 20, 22, each individual motor 210, 212, 220, 222 consistently reported a different amperage draw value. The amperage draws were read from the motor's electrical panels, while running empty and with sawdust. The amperages displayed in charts 603 and 604 of FIGS. 6C and 6D, respectively, represent the highest draw value obtained from all four rollers 10, 12, 20, 22, for each test.

The highest values were obtained from the motors 220, 220 connected to the first and second anvil rollers 20, 22, the highest being displayed on the first anvil roller 20. A value of 42 Amps was verified at full and half speed as the average power demand when running empty. Both charts 603, 604 show a similar pattern, in which there is a higher demand for power as the thickness of the mat is increased as well as when the speed of the metal band 50 is decreased. The results generally showed higher demands running at half-speed (except with the 2-inch mat). They appear to display higher amperage draws for DF as well, suggesting that there might be a higher demand on the motors when drier species are dewatered. With a 4-inch mat, a current draw of over 100 Amps was obtained for both species.

Figure 6E:
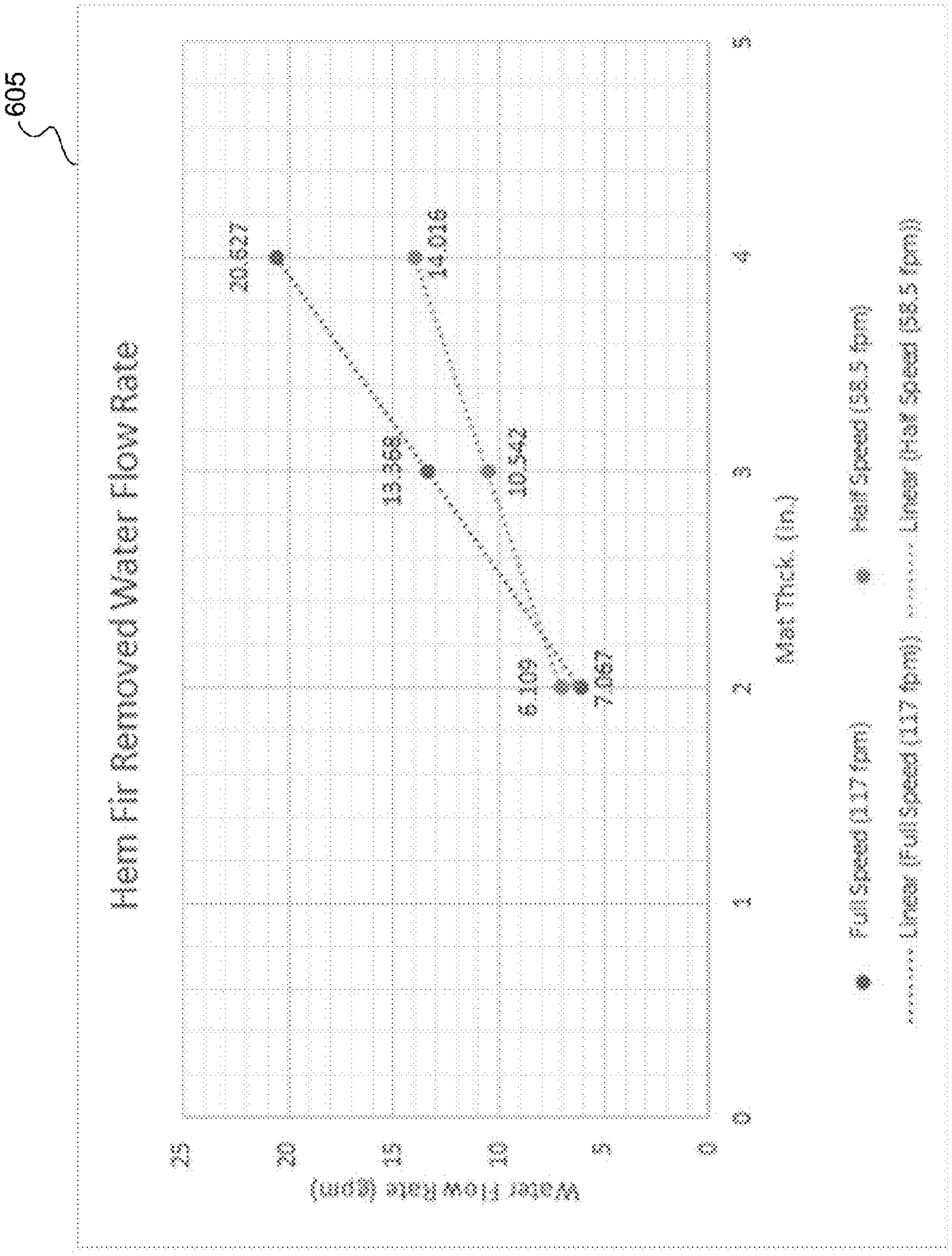
FIGS. 6E and 6F provide charts that represent removed water flow rates measured for each test illustrated in and discussed with reference to FIGS. 6A and 6B.
Figure 6F:
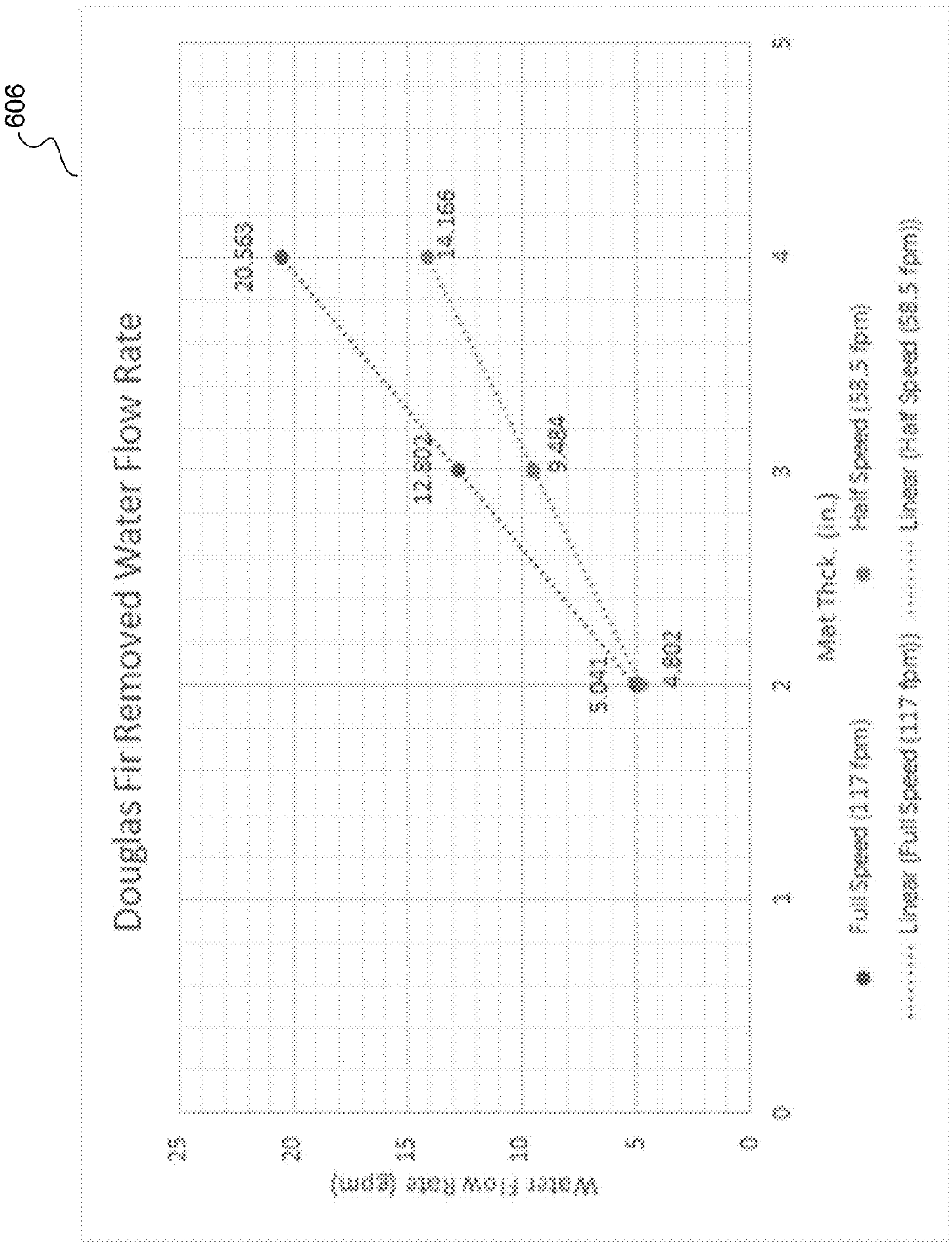

Flow rates were measured by timing how fast the water separated from the wood material would fill a 5-gallon bucket. FIGS. 6E and 6F are charts that represent the flow rates measured during testing. In both charts 605 and 606, it is clear for both species that there is an increase in water, with an increase in thickness of the mat and also with an increase in speed.

Figure 6H:
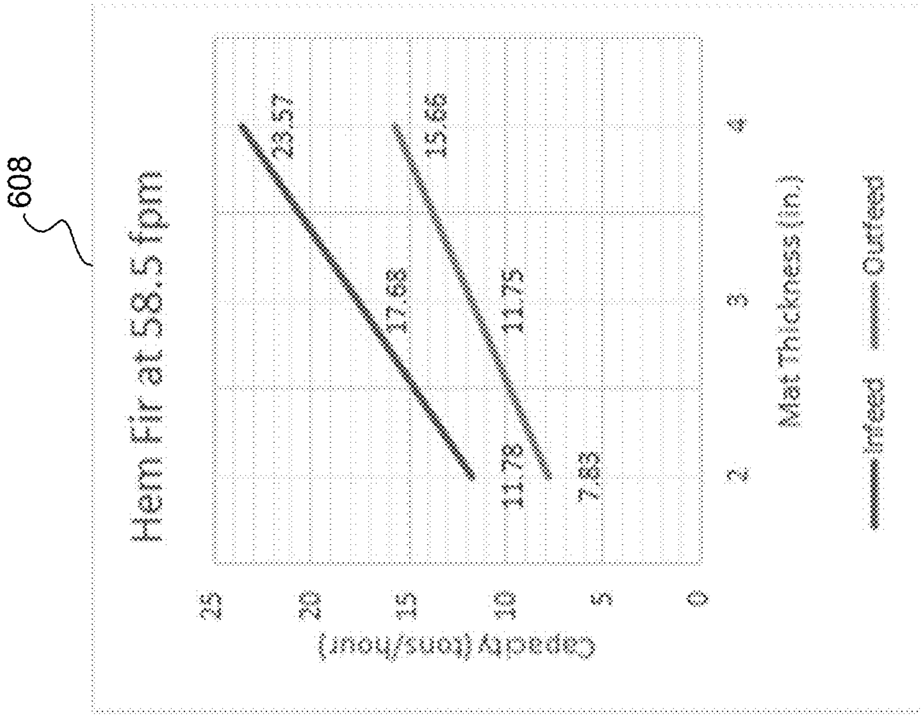
Figure 6G:
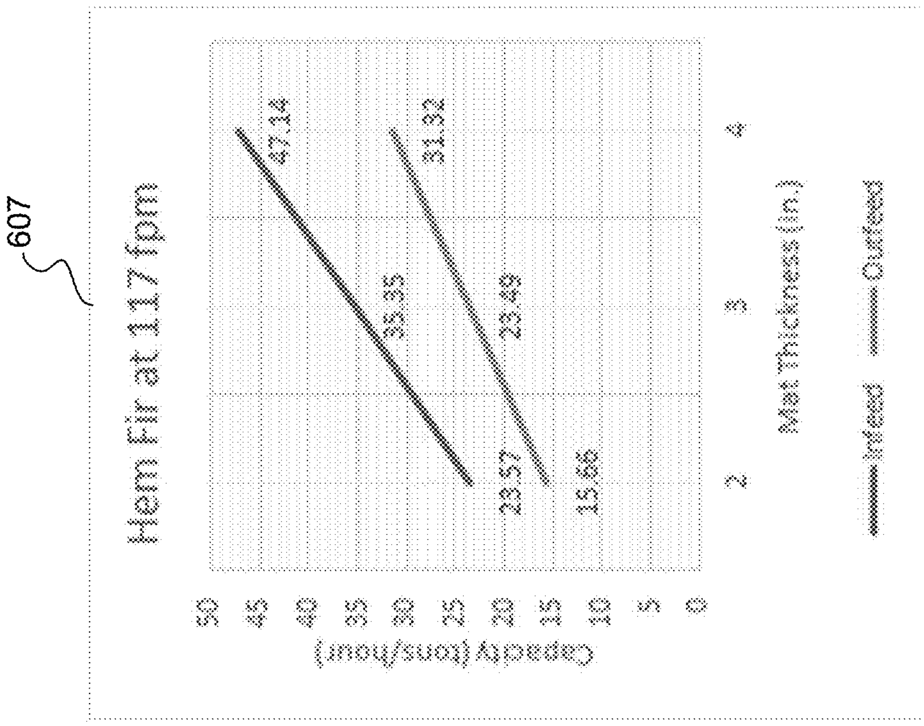

FIGS. 6G and 6H illustrate charts 607 and 608 that describe the throughput, measured in tons per hour at the infeed and the outfeed of the moisture removing press 100 running at full speed and half speed with varying mat thicknesses of HF.

Figure 6J:
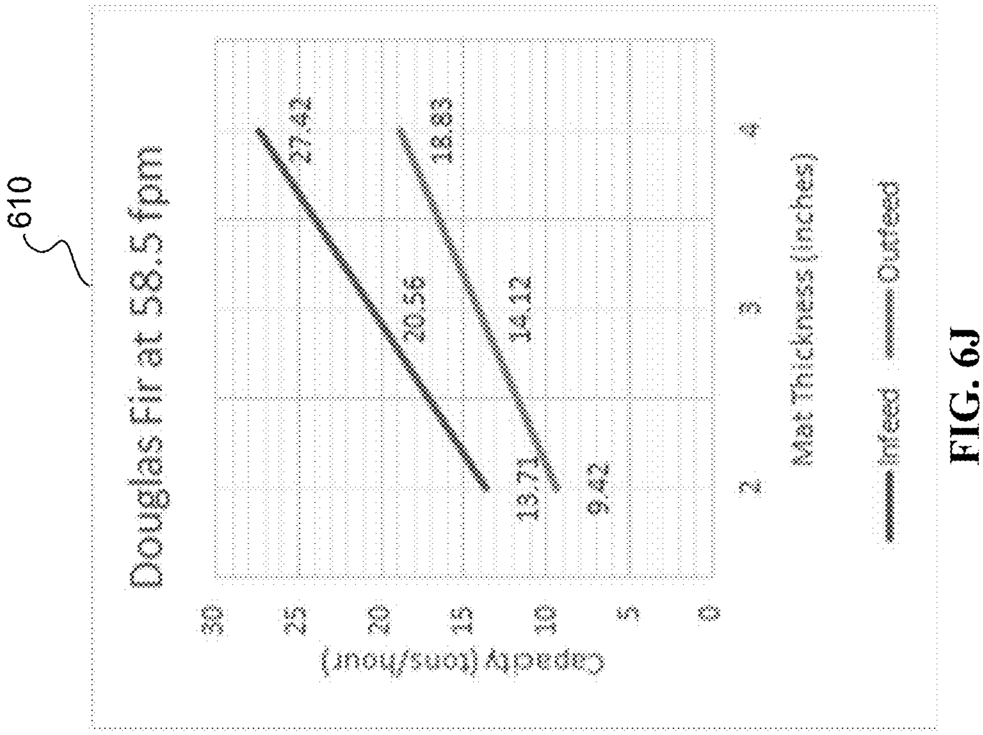
Figure 6I:
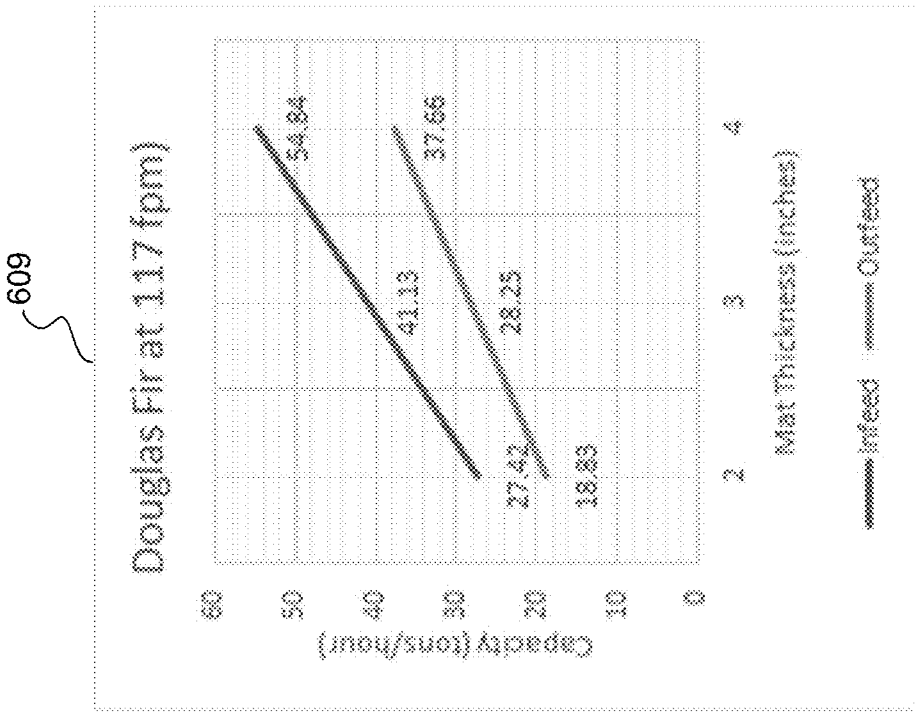

FIGS. 6I and 6J illustrate charts 609 and 610 that describe the throughput, measured in tons per hour at the infeed and the outfeed of the moisture removing press 100 running at full speed and half speed with varying mat thicknesses of DF.

In view of the various test results discussed above, is has been determined that in order to achieve high electrical efficiency along with desirable moisture content removal, operational metal band 50 speeds between 58.5 fpm and no more than 117 fpm are desirable, while being able to adjust speeds and mat thicknesses based on desired MC and energy efficiency. For example, as illustrated in FIGS. 6A and 6B, as the speed is decreased below full speed, the MC decreases, with a slight trade-off on power consumption.

Environmental Benefits

Liquids and moisture retained by sawdust can contain chemicals that are harmful to the environment if placed into a sewage system or another water waste type system that returns water waste back to the environment. Typical sewage systems and/or other types of water waste systems may not be configured to remove the chemicals contained in the moisture removed from the sawdust. It is beneficial to remove and properly treat the chemicals included in the wet sawdust by expressing the moisture from the wet sawdust and then treating it. This process will prevent the chemicals included in the wet sawdust and/or extracted from the wet sawdust from being placed into the sewage system and/or other water waste type system.

Additionally, transportation of wood materials having a lower moisture content provides environmental benefits, as more wood materials can be transported in a single load as a result of a reduction in weight and volume. Improved transportation efficiency reduces the carbon footprint of the entire process of delivering wood materials.

An example is provided using the following limits for a single delivery truck: (i) 100,000 lbs. (Gross); (ii) 35,000 lbs. (Truck Tare); and (iii) 65,000 lbs. (32.5 tons (Net)), having a volume capacity of 150 $yd^3$/4050 $ft^3$.

Densities for Hem fir are:

$$18.6\ \frac{\text{lbs}}{\text{ft}^3}\ @$$

Infeed (at 61% MC); and $$15.7\ \frac{\text{lbs}}{\text{ft}^3}\ @$$

Outfeed (at 41% MC).

For Hem Fir, before the removal of moisture by the moisture removing press the weight limit of the truck would be reached before the volume limit was reached. In other words, the truck was not completely full because the weight was too much. For example, to fill a truck up to the maximum volume with 61% moisture content, one would have a weight of $$4050\ \text{ft}^3 \times 18.6\ \frac{\text{lbs}}{\text{ft}^3} = 37.7\ \text{tons},$$

which is above the 32.2 ton limit. As such, one would only be able to fill up $$\frac{35{,}000\ \text{lbs}}{18.6\ \frac{\text{lbs}}{\text{ft}^3}} = 3,\ 494.62\ \text{ft}^3$$

of the total 4,050 $ft^3$ volume of the truck trailer, which corresponds to $$\frac{3494.62\ \text{ft}^3}{4050\ \text{ft}^3} = 86\%$$

of the truck trailer. After reducing the moisture content to 41%, one could fill the truck trailer to its maximum volume and have a weight of 4,050 $ft^3\times$ $$15.7\ \frac{\text{lbs}}{\text{ft}^3} = 31.4\ \text{tons},$$

which is below the 32.2 ton limit. Actually, at the 41% moisture content, one could potentially fill $$\frac{35{,}000\ \text{lbs}}{15.7\ \frac{\text{lbs}}{\text{ft}^3}} = 4,\ 193.55\ \text{ft}^3$$

which is $$\frac{4140.13\ \text{ft}^3}{4050\ \text{ft}^3} = 104\%$$

of the truck trailer.

Accordingly, the moisture removing press can be used to achieve the volume limit of the truck trailer before hitting the weight limit. This would allow an additional 4.23 tons of Hem Fir having a moisture content of 41% to be added to the truck trailer before reaching the maximum weight limit, in contrast to using Hem Fir having a moisture content of 61%.

As another example, densities for Doug Fir are: 21.6 lbs/$ft^3$@Infeed (at 54% MC); and 18.5 lbs/$ft^3$ Outfeed (at 42% MC). For Doug Fir, before the remove of moisture by the moisture removing press the weight limit of the truck would be reached before the volume limit was reached. In other words, the truck trailer was not completely full because the weight was too much. For example, to fill a truck trailer to the maximum volume with 54% moisture content, one would have a weight of $$4{,}050\ \text{ft}^3 \times 21.6\ \frac{\text{lbs}}{\text{ft}^3} = 43.7\ \text{tons},$$

which is above the 32.2 ton limit. As such, one would only be able to fill up $$\frac{35{,}000\ \text{lbs}}{21.6\ \frac{\text{lbs}}{\text{ft}^3}} = 3,\ 009.26\ \text{ft}^3$$

of the total 4,050 $ft^3$ volume of the truck trailer, which corresponds to $$\frac{3{,}009.26\ \text{ft}^3}{4,\ 050\ \text{ft}^3} = 74\%$$

of the truck trailer. After reducing the moisture content to 42%, one could fill the truck trailer to its maximum volume and have a weight of $$4{,}050\ \text{ft}^3 \times 18.5\ \frac{\text{lbs}}{\text{ft}^3} = 37.5\ \text{tons},$$

which is still above the 32.5 ton limit. Accordingly, one could fill $$\frac{35{,}000\ \text{lbs}}{18.5\ \frac{\text{lbs}}{\text{ft}^3}} = 3{,}513.51\ \text{ft}^3$$

of the total 4,050 $\text{ft}^3$ of the truck trailer at a moisture content of 42%, which corresponds to $$\frac{3{,}513.51\ \text{ft}^3}{4{,}050\ \text{ft}^3} = 87\%$$

of the truck trailer, which is an improvement over 74% of the truck trailer. This would allow an additional 4.2 tons of Doug Fir having a moisture content of 42% to be added to the truck trailer before reaching the maximum weight limit, in contrast to using Doug Fir having a moisture content of 54%.

In view of the above, the environmental benefits provided by the moisture removing press are, at least, two-fold. First, the reduction of harmful chemical included in the wood material before it leaves the processing plant and second, the improved transportation efficiency.

Some Particular Implementations

Below various implementations of the moisture removing press and method thereof are described.

The technology disclosed can be practiced as a system, method, or apparatus. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A system implementation of the technology disclosed includes a continuous liquid permeable sheet metal band allowing liquid to permeate therethrough. Viaways, grooves or perforations or any combination thereof can provide liquid permeability. A first pressing roller is located above the sheet metal band. A first anvil roller is located below the sheet metal band, forming a first nip with the first pressing roller and the sheet metal band. The sheet metal band being located between the first pressing roller and the first anvil roller. A conveyor roller is configured to convey the continuous sheet metal band between the first pressing roller and the first anvil roller at (i) a speed selectable within a range and (ii) at an angle with respect to a horizontal plane. The continuous sheet metal band conveys the wood material through the first nip. Pressure created by the first pressing roller and the first anvil roller extracts a portion of the moisture away from the wood material. At least a portion of the extracted portion of the moisture permeates through the sheet metal band, as a liquid or slurry, without necessitating using a suction device, a blowing device or a scraping device.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

One moisture removing press implementation further includes a universal joint coupling the first pressing roller to a source of rotary motion to rotate the first pressing roller and a frame coupled by linkages to a source of force configured to exert pressure in a selectable pressure range in a substantially downward direction; thereby exerting pressure on the wood material conveyed by the continuous sheet metal band.

In one moisture removing press implementation the selectable pressure range between 5,000 and 8,000 psi.

In one moisture removing press implementation the selectable speed range includes a speed range of 65 feet per minute (fpm) to 110 fpm.

In one moisture removing press implementation, a moisture content percentage of wood material output from the moisture removing press is in a range between 40% to 45%.

In one moisture removing press implementation, at least one of the first pressing roller and the first anvil roller includes a grooved surface.

In one moisture removing press implementation, a second pressing roller is located above a loop formed by the sheet metal band and a second anvil roller located inside the loop formed by the sheet metal band. The sheet metal band passes through a second nip formed by the second pressing roller and the second anvil roller. The second pressing roller and the second anvil roller are arranged downstream of the first nip.

In one moisture removing press implementation, the angle is between 1 degree and 10 degrees with respect to an horizontal plane.

In one moisture removing press implementation, the horizontal plane is essentially level to a surface upon which the moisture removing press resides.

In one moisture removing press implementation, the angle is inclined from an input side of the moisture removing press to an output side of the moisture removing press, such that the output side of the moisture removing press is elevated higher than the input side of the moisture removing press.

In one moisture removing press implementation, the angle is declined from an input side of the moisture removing press to an output side of the moisture removing press, such that the input side of the moisture removing press is elevated higher than the output side of the moisture removing press.

In one moisture removing press implementation, the horizontal plane is essentially level to a surface upon which the moisture removing press resides.

A method implementation of the technology disclosed includes a method of extracting moisture from wood material. The method includes depositing the wood material on a continuous and liquid permeable sheet metal band. The sheet metal band can include viaways, grooves, perforations or the like allowing liquid to permeate therethrough. The sheet metal band can be located between a first pressing roller and a first anvil roller. The method further includes transporting the wood material by moving the sheet metal band at a speed selectable within a range. The method also includes passing the wood material through a first nip formed by the first pressing roller, the first anvil roller and the sheet metal band to remove a portion of the moisture away from the wood material, such that the at least a portion of the extracted portion of the moisture permeates through the viaways of the sheet metal band without necessitating using a suction device, a blowing device or a scraping device. The sheet metal band is conveyed at an angle with respect to a horizontal plane.

Each of the features discussed in this particular implementation section for the first system implementation apply equally to this method implementation. As indicated above, all the system features are not repeated here and should be considered repeated by reference.

Other implementations may include a non-transitory computer readable storage medium storing instructions executable by a processor to perform a method as described above. Yet another implementation may include a system including memory and one or more processors operable to execute instructions, stored in the memory, to perform a method as described above.

In one implementation of our method, the selectable speed range includes a speed of 65 feet per minute (fpm) to 110 fpm.

In one implementation, our method further comprises removing debris from the sheet metal band using a cleaning device disposed inside a loop formed by the sheet metal band.

In one implementation, our method further comprises passing the sheet metal band through a second nip arranged downstream of the first nip, the second nip being formed by a second pressing roller located outside a loop formed by the sheet metal band and a second anvil roller located inside the loop.

In one implementation, our method further comprises directing wood material output from the first nip formed by the first pressing roller and the first anvil roller in an inward direction with respect to a centerline of the sheet metal band using a plurality of guides.

In one implementation of our method, a moisture content percentage of wood material exiting the first nip is in a range between 40% to 45%.

In one implementation of our method, the angle is between 1 degree and 10 degrees with respect to the horizontal plane.

In one implementation of our method, the horizontal plane is essentially level to a surface upon which the moisture removing press resides.

While implementations of the technology are disclosed by reference to the preferred embodiments and examples detailed above, it is to be understood that these examples are intended in an illustrative rather than in a limiting sense. It is contemplated that modifications and combinations will occur to those skilled in the art, which modifications and combinations will be within the spirit of the technology disclosed and the scope of the following claims. For example, different materials may be used to construct the press and its components; switches and controls can be placed in different configurations and/or positions. Some controls may be merged into single controls for simplification. Aural feedback can replace or augment visual indicators. Other colors and states for visual indicators may be used. Component values are recommendations, but can differ among implementations and individual units of a particular implementation due to manufacturing tolerances. Components may be sourced from different suppliers that provide parts of analogous functionality under different brand or type names.

One or more elements of one or more claims can be combined with elements of other claims. Any and all patents, patent applications and printed publications referred to above are incorporated by reference.

We claim as follows:

1. A moisture removing press for extracting moisture from wood material, the moisture removing press comprising:

a continuous and liquid permeable sheet metal band including viaways allowing liquid to permeate therethrough;

a first pressing roller located above the sheet metal band;

a first anvil roller located below the sheet metal band and forming a first nip with the first pressing roller and the sheet metal band, the sheet metal band being located between the first pressing roller and the first anvil roller, such that the first nip includes only the first pressing roller and the sheet metal band; and a conveyor roller configured to convey the continuous sheet metal band between the first pressing roller and the first anvil roller at (i) a speed selectable within a range and (ii) at an angle with respect to a horizontal plane, wherein the continuous sheet metal band conveys the wood material through the first nip, such that the first pressing roller is in direct contact with the wood material as it passes through the first nip, wherein pressure created by the first pressing roller and the first anvil roller extracts a portion of the moisture away from the wood material, and wherein at least a portion of the extracted portion of the moisture permeates through the viaways of the sheet metal band, as a liquid, without using a suction device, a blowing device and a scraping device.

2. The moisture removing press according to claim 1, further including:

a universal joint coupling the first pressing roller to a source of rotary motion to rotate the first pressing roller; and a frame coupled by linkages to a source of force configured to exert pressure in a selectable pressure range in a substantially downward direction; thereby exerting pressure on the wood material conveyed by the continuous sheet metal band.

3. The moisture removing press according to claim 2, wherein the selectable pressure range includes a pressure range of 5,000 pounds per square inch (psi) to 8,000 psi.

4. The moisture removing press according to claim 1, wherein the selectable speed range includes a speed range of 65 feet per minute (fpm) to 110 fpm.

5. The moisture removing press according to claim 1, wherein a moisture content percentage of wood material output from the moisture removing press is in a range between 40% to 45%.

6. The moisture removing press according to claim 1, wherein at least one of the first pressing roller and the first anvil roller includes a grooved surface.

7. The moisture removing press according to claim 1, further comprising:

a second pressing roller located above a loop formed by the sheet metal band; and a second anvil roller located below the loop formed by the sheet metal band, forming a second nip with the second pressing roller and the sheet metal band, the sheet metal band being located between the second pressing roller and the second anvil roller, wherein the sheet metal band passes through the second nip, and wherein the second pressing roller and the second anvil roller are arranged downstream of the first nip.

8. The moisture removing press according to claim 1, wherein the angle is between 1 degree and 10 degrees with respect to an horizontal plane.

9. The moisture removing press according to claim 8, wherein the horizontal plane is essentially level to a surface upon which the moisture removing press resides.

10. The moisture removing press according to claim 1, wherein the angle is inclined from an infeed side of the moisture removing press to an outfeed side of the moisture removing press, such that the outfeed side of the moisture removing press is elevated higher than the infeed side of the moisture removing press.

11. The moisture removing press according to claim 1, wherein the angle is declined from an infeed side of the moisture removing press to an outfeed side of the moisture removing press, such that the infeed side of the moisture removing press is elevated higher than the outfeed side of the moisture removing press.

12. The moisture removing press according to claim 1, further comprising a heating element disposed inside a loop formed by the sheet metal band, wherein the heating element heats the wood material as it is conveyed from an infeed side of the moisture removing press along the sheet metal band to an outfeed side of the moisture removing press.

* * * * *